(12) United States Patent
de Wagenaar et al.

(10) Patent No.: US 10,670,508 B2
(45) Date of Patent: Jun. 2, 2020

(54) MICROFLUIDIC DEVICE FOR SELECTION OF SEMEN

(71) Applicant: Semen Refinement B.V., Enschede (NL)

(72) Inventors: Bjorn de Wagenaar, Enschede (NL); Loes Irene Segerink, Enschede (NL); Wouter Olthuis, Enschede (NL); Adrianus Joseph Sprenkels, Enschede (NL); Albert van den Berg, Enschede (NL)

(73) Assignee: SEMEN REFINEMENT B.V., Enschede (NL)

( * ) Notice: Subject to any disclaimer, the term of this patent is extended or adjusted under 35 U.S.C. 154(b) by 85 days.

(21) Appl. No.: 15/762,689

(22) PCT Filed: Sep. 30, 2016

(86) PCT No.: PCT/EP2016/073467
§ 371 (c)(1),
(2) Date: Mar. 23, 2018

(87) PCT Pub. No.: WO2017/055581
PCT Pub. Date: Apr. 6, 2017

(65) Prior Publication Data
US 2018/0266937 A1    Sep. 20, 2018

(30) Foreign Application Priority Data

Sep. 30, 2015 (EP) .................................... 15187812

(51) Int. Cl.
*G01N 15/10* (2006.01)
*B01L 3/00* (2006.01)

(52) U.S. Cl.
CPC .... *G01N 15/1031* (2013.01); *B01L 3/502761* (2013.01); *B01L 3/502776* (2013.01);
(Continued)

(58) Field of Classification Search
CPC ....... B01L 2200/143; B01L 2300/0645; B01L 2400/0424; B01L 2400/043;
(Continued)

(56) References Cited

U.S. PATENT DOCUMENTS

2005/0118705 A1   6/2005   Rabbitt et al.
2007/0125941 A1   6/2007   Lee et al.
(Continued)

FOREIGN PATENT DOCUMENTS

EP    2211164 A1   7/2010
EP    2259045 A1   12/2010
(Continued)

OTHER PUBLICATIONS

Bernabini et al., "Micro-Impedance Cytometry for Detection and Analysis of Micron-Sized Particles and Bacteria," Lab Chip (2011) 11:407-412.
(Continued)

*Primary Examiner* — Deborah K Ware
(74) *Attorney, Agent, or Firm* — Pierce Atwood LLP; Raymond G. Arner

(57) ABSTRACT

The invention provides a system (1) for performing sperm analysis and selection based on sperm cell morphology of sperm cells (6) in a fluid (5), the system (1) comprising: (i) a fluid flow channel (2) for transport of said fluid (5), the fluid flow channel (2) comprising an inlet (10) an analyzing zone (40) configured downstream from said inlet (10) and comprising a first pair of electrodes (41) comprising a first intra-electrode distance (dl), a sorting zone (50) configured downstream from said analyzing zone (40) and comprising a sorting device (51), and outlets (80, 90, . . . ) configured downstream from said sorting zone (50); (ii) an electric source (140) configured to provide an electric signal to the first pair of electrodes (41); (iii) a measuring device (150)
(Continued)

functionally coupled to the first pair of electrodes (41) and configured to measure a first impedance as a function of time of the fluid (5) between the first pair of electrodes, and to provide time-dependent impedance data; wherein the sorting device (51) is configured to sort sperm cells (6) by directing the sperm cell (6) in the sorting zone (50) to one of the outlets (80, 90, ...) based on a comparison in a comparison stage of the time dependent impedance data with predefined reference data.

20 Claims, 6 Drawing Sheets

(52) U.S. Cl.
CPC .... *G01N 15/1056* (2013.01); *B01L 2200/143* (2013.01); *B01L 2300/0645* (2013.01); *B01L 2300/0864* (2013.01); *B01L 2400/043* (2013.01); *B01L 2400/0424* (2013.01); *G01N 2015/1081* (2013.01); *G01N 2800/367* (2013.01)

(58) Field of Classification Search
CPC ......... B01L 3/502761; B01L 3/502776; B01L 2300/0864; G01N 15/1031; G01N 15/1056; G01N 2015/1081; G01N 2800/367; C12N 5/0612; C12N 5/061
See application file for complete search history.

(56) References Cited

U.S. PATENT DOCUMENTS

2013/0256197 A1 10/2013 Katsumoto
2013/0266979 A1* 10/2013 Segerink ........... B01L 3/502707
435/29
2014/0248621 A1 9/2014 Collins

FOREIGN PATENT DOCUMENTS

EP          2508253 A1    10/2012
WO       2004/053465 A2    6/2004
WO       2012011810 A1 *  1/2012

OTHER PUBLICATIONS

European Search Report for European Patent Application No. 15187812.1, dated Mar. 11, 2016, 15 pages.
Gou et al., "Label-Free Electrical Discrimination of Cells at Normal, Apoptotic and Necrotic Status with a Microfluidic Device," Journal of Chromatography A, 1218 (2011) 5725-5729.
International Search Report and Written Opinion for International Patent Application No. PCT/EP2016/073467, dated Nov. 11, 2016, 16 pages.
Kemna et al., "Label-Free, High-Throughput, Electrical Detection of Cells in Droplets," Analyst (2013) 138:4585-4592.
Segerink et al., "On-Chip Determination of Spermatozoa Concentration Using Electrical Impedance Measurements," Lab Chip (2010) 10:1018-1024.
Sun and Morgan, "Single-Cell Microfluidic Impedance Cytometry: A Review," Microfluid Nanofluid (2010) 8:423-443.
Tsai et al., "Application of Microfluidic Technologies to the Quantification and Manipulation of Sperm," Urological Science xxx (2014) 1-4.
European Official Communication dated Mar. 8, 2019 in European Patent Application No. 16775706.1, 13 pages.
Cheung, et al., "Impendance Spectroscopy Flow Cytometry: On-Chip Label-Free Cell Differentiation," Cytometry Part A, vol. 65A, No. 2, pp. 124-132 (2005).

* cited by examiner

MICROFLUIDIC DEVICE FOR SELECTION OF SEMEN

CROSS REFERENCE TO RELATED APPLICATIONS

This application is a U.S. National Stage of PCT International Application No. PCT/EP2016/073467, filed Sep. 30, 2016, which claims priority to European Patent Application No. 15187812.1, filed Sep. 30, 2015, the entire contents of which is incorporated herein by reference.

FIELD OF THE INVENTION

The invention relates a system for sorting sperm cells as well as to a method for sorting sperm cells. The invention also relates to a sperm product.

BACKGROUND OF THE INVENTION

The maintenance of sperm morphology and motility to increase the success rate of artificial insemination is known in the art, and is e.g. described in WO2004053465A2. In this document a method and device for assaying sperm motility in a forward direction and density of active sperm in a semen sample are described. The device includes a microfluidics structure having a sample reservoir, a downstream collection region and a microchannel extending there between. The microchannel is dimensioned to confine sample sperm to single-direction movement within the channel, such that sperm in a semen sample placed in the sample reservoir enter and migrate along the microchannel toward and into the collection region. Also included is a detector for detecting the presence of labeled sperm in the microchannel or collection region, and an electronics unit operatively connected to the detector for (i) receiving detector signals, (ii) based on the detector signals received, determining sperm motility and density in the sperm sample, and (iii) displaying information related to sperm motility and density.

EP2508253A1 describes a channel device including a nano-size channel through which single molecule flows, at least one electrode pair arranged near the nano-size channel, and an AC power source that applies an AC voltage to the electrodes. This channel device is useful for identifying molecules one by one. Furthermore, a channel device is described including a nano-size channel through which single molecule flows, a branching portion, and a plurality of branching channels, wherein (i) an electrode pair is arranged near the nano-size channel so as to sandwich the nano-size channel between the electrodes, or (ii) one electrode of the electrode pair is located near the nano-size channel, whereas the other is arranged near the branching channels. This channel device is useful for separating single molecule. The channel device achieves identification or separation at an accuracy of 100% in principle. A sample treatment apparatus according to inventors includes a channel device, a measurement section, and an arithmetic processing section. The measurement section applies a voltage (DC or AC) to between electrodes of an electrode pair installed in the nano-size channel, and measures an electric signal when single molecule passes between the electrodes to identify the molecule.

EP2211164 A1 describes that the electrical properties of particle solutions can be investigated on a single particle basis by using micro fluidic channels. The impedance can be measured across the channel using at least one pair of conductive electrodes, at least one electrode of a pair being a fingered electrode having a plurality of fingers. The pattern of fingered electrodes creates a longer and more complicated measurement signal shape which leads to a significant improvement of measurement sensitivity. An application for the proposed technology is to significantly improve the measurement sensitivity of impedance measurements on blood cells, leading to a better differentiation between different types of white blood cells. Better measurement sensitivity also enables the measurement of smaller particles and higher throughput.

US2005/0118705 A1 describes apparatus and methods for performing microanalysis of particles using a microelectrical-mechanical system (MEMS) chip to electrically interrogate the particles. The MEMS chip is typically manufactured using known lithographic micromachining techniques, employed for example, in the semiconductor industry. A substrate carries a plurality of microelectrodes disposed in a detection zone and spaced apart along an axis of a microchannel. The microchannel is sized in cross-section to cause particles carried by a fluid to move past the electrodes in single file. Impedance is measured between one or more pairs of electrodes to determine the presence of a particle in the detection zone.

US2013/0256197 A1 describes a flow channel device that includes a flow channel in which a fluid containing a particle flows, a plurality of branch channels branched from the flow channel, and an electrode unit. The electrode unit includes a first electrode having a first area and a second electrode having a second area different from the first area, and is configured to form a guide electrical field in the flow channel, which guides the particle to a predetermined branch channel out of the plurality of branch channels. The second electrode is opposed to the first electrode so that the flow channel is sandwiched between the first electrode and the second electrode.

US2014/0248621 A1 describes microfluidic devices and methods that use cells such as cancer cells, stem cells, blood cells for preprocessing, sorting for various biodiagnostics or therapeutical applications. Microfluidics electrical sensing such as measurement of field potential or current and phenomena such as immiscible fluidics, inertial fluidics are used as the basis for cell and molecular processing (e.g., characterizing, sorting, isolation, processing, amplification) of different particles, chemical compositions or biospecies (e.g., different cells, cells containing different substances, different particles, different biochemical compositions, proteins, enzymes etc.). Specifically the document describes a few sorting schemes for stem cells, whole blood and circulating tumor cells and also extracting serum from whole blood.

Segerink et al. describe in "On-chip determination of spermatozoa concentration using electrical impedance measurements" Lab on a Chip vol. 10 (8), (2010) a microfluidic chip to determine the concentration of spermatozoa in semen. For the method, a microchannel with a planar electrode pair that allows the detection of spermatozoa passing the electrodes using electrical impedance measurements. It is further described that cells other than spermatozoa in semen also cause a change in impedance when passing the electrodes, interfering with the spermatozoa count. The change in electrical impedance is related to the size of cells passing the electrodes, allowing distinguishing between spermatozoa and HL-60 cells suspended in washing medium or polystyrene beads.

SUMMARY OF THE INVENTION

Artificial insemination (AI) is a well-established technique in the animal industry for livestock production. Selection of sperm samples for AI is based on sperm concentration, cell motility and morphology. All factors have shown impact on the success rate of fertilization and the abundance of offspring. Therefore, AI centers live up to high standards to supply high quality sperm samples to ensure high probability of fertilization after AI. Some examples of criteria for sperm sample rejection are a low sperm cell motility (less than 60% progressive motility or 70% motility (both for pigs and cattle), in the fresh sample), a low overall concentration, and a high number of morphologically abnormal sperm cells (>15-20%). A frequently occurring sperm defect is the presence of a cytoplasmic droplet on the sperm flagellum. This droplet is part of the cytoplasm of the spermatids, which was not removed from the flagellum at the end of spermiogenesis. Cytoplasmic droplets are usually found in one of two positions. Near the head of a sperm cell proximal cytoplasmic droplets may be found, whereas so-called distal droplets may be present at the tail further away from the head. Although the effect of residual cytoplasm retention on human infertility is a controversial subject in the clinic, many sources show the contribution of droplet content, especially distal droplet content, on sub-fertility in domestic species. Therefore, (cattle and pig) sperm samples containing over 20% of cells with cytoplasmic droplets are (in general) withheld from AI. In the selection process, a high number of healthy, morphologically normal sperm cells are discarded. Unfortunately, routine sperm refinement techniques such as sperm density centrifugation and sperm swim-up are not suitable for recovering these sperm cells for AI purposes.

A potential approach to obtain these healthy and morphologically normal sperm cells from discarded samples is the use of microfluidic technology. Microfluidic systems have been used for the manipulation, analysis and enrichment of viable, motile sperm cells.

However, known systems do not seem to be capable of performing sperm analysis and selection based on cell morphology (on the single cell level). Separation of morphologically normal and morphologically abnormal, such as cytoplasmic droplet containing sperm cells, is not a straightforward process, because both species are very similar. A plausible criterion to distinguish these species is the total cell mass, since abnormalities may, and especially cytoplasmic droplet content will affect this property.

Hence, it is an aspect of the invention to provide an alternative system for sorting biological cells and especially sperm cells, which preferably further at least partly obviates one or more of above-described drawbacks. At least part of the system may be comprised on a chip. It is a further aspect of the invention to provide a method for sorting sperm cells, especially for performing sperm analysis and selection based on a cell characteristic, especially cell morphology (on the single cell level), therewith preferably to at least partly obviate one or more of above-described drawbacks.

Hence, the invention provides in a first aspect a system, especially for sorting (a) sperm cell(s) in a fluid, the system comprising (i) a fluid flow channel for transport of said fluid, the fluid flow channel comprising an inlet, an analyzing zone configured downstream from said inlet and comprising a first pair of electrodes comprising a first intra-electrode distance, a sorting zone configured downstream from said analyzing zone, and (at least two) outlets configured downstream from said sorting zone, (ii) an electric source configured to provide an electric signal to the first pair of electrodes, (iii) a measuring device functionally coupled to the first pair of electrodes and configured to measure a first impedance as a function of time of the fluid between the first pair of electrodes, and to provide time-dependent impedance data; (iv) a sorting device configured to sort sperm cells by directing a sperm cell in the sorting zone to one of the outlets based on a comparison in a comparison stage of the time dependent impedance data with predefined reference data.

Especially the system comprises a system for sorting and discriminating sperm cells based on sperm cell characteristics, e.g., sperm cell morphology, (sperm cell) DNA integrity, abnormalities inside of the sperm such a as vacuoles, acrosome deficiency, etc. Especially, the system comprises a system for performing sperm analysis and selection based on (a) sperm cell characteristic(s) of sperm cells (see further below).

In embodiments, the system may allow discriminating sperm cells having different sperm cell morphologies from each other, and especially successively separating the discriminated sperm cells. Especially, the system comprises a system for performing sperm analysis and selection based on sperm cell morphology of sperm cells (on the single cell level).

Especially herein the term "sorting" such as in "soring a sperm cell" may relate to discriminating sperm cells and especially successively physically sorting, i.e. separating a sperm cell from another sperm cell (especially based on a characteristic of the sperm cell). Especially, the term "sorting a sperm cell" may relate to performing sperm analysis and selection based on a sperm cell characteristic, especially sperm cell morphology. Especially, the term "sorting a sperm cell" may relate to sorting between a first sperm cell and a further sperm cell based on a characteristic, especially based on a presence of the characteristic or a value of the characteristic.

Especially, this system allows performing sperm analysis and selection based on (abnormal) sperm cell characteristics, such as (abnormal) cell morphology, especially on a single cell level. Especially, the system can be applied for detecting a sperm cell comprising an abnormality or specific characteristic, such as an abnormal sperm (cell) morphology, in the analyzing zone and sorting the sperm cell comprising the abnormality or specific characteristic from a fluid comprising sperm cells, especially a sperm cell in a sorting zone configured downstream of the analyzing zone. Discrimination success, especially with respect to cell morphology, with this system may be over 65%. Hence, this system can be used for a quick and high quality screening, leading to substantially less discard of healthy, morphologically normal sperm cells, that otherwise may be withheld for AI. An advantage of the micro-fluidic system is that it can easily be scaled up, such as by parallel processing on the same chip. Hence, for sorting between a (morphological) normal sperm cell (especially a sperm cell comprising a normal sperm (cell) morphology) and an abnormal sperm cell or a sperm cell comprising a (determined) characteristic, the system especially may comprise two outlets, such as a first outlet and a second outlet. Especially for sorting between a normal sperm cell, an abnormal sperm cell and for instance another particulate material, the system may comprise at least three outlets. A particulate material that may be comprised in sperm is for instance debris. A sperm cell, especially, is (also) a particulate material. Hence a particulate material may comprise a sperm cell. A particulate material may especially comprise other particulate material, especially other particulate material may not comprise a sperm cell. Hence, the fluid flow channel may comprise two or more outlets for sorting sperm and/or other particulate material. Especially the terms "normal" and "abnormal" as in "a normal sperm cell" and "an abnormal sperm cell" may relate to a characteristic (see further below) of the sperm cells (such as the absence or presence of a cytoplasmic droplet) Especially, an abnormal sperm cell comprises an anomaly.

The fluid may in embodiments comprise e.g. non-diluted semen. Alternatively or additionally, the fluid further may comprise other liquids. The fluid may for instance comprise diluted semen. As diluent, e.g. water may be applied, optionally in combination with one or more dissolved salts and/or sugars, such as in the case of a Beltsville Thawing solution. The fluid may comprise semen diluted in a range of e.g. 10-10.000 times dilution. In embodiments, the sperm concentration in the fluid is selected from the range of $10^4$-$5·10^8$ cells ml$^{-1}$. Especially, the fluid comprises a liquid. Especially, the fluid allows moving the sperm cell (in the fluid) through the system, especially through the fluid flow channel. The fluid (comprising a sperm cell) may be provided at the inlet of the fluid flow channel, wherein the fluid may further flow through the fluid flow channel in the direction of an outlet arranged downstream (during normal operation) of the inlet. The inlet especially is configured to allow a fluid to enter the fluid flow channel. The inlet may be in fluid connection with another fluid channel. The inlet may further be in fluid connection with a container (reservoir) comprising the fluid. Especially the inlet is in fluid connection with means to supply the fluid (comprising a sperm cell), especially to provide a fluid flow in the fluid flow channel. The inlet may comprise one inlet. The inlet may also comprise more than one inlet. Hence, the system may further include a pump configured to provide a flow of the fluid through the fluid flow channel.

The analyzing zone is especially configured for allowing the fluid (comprising a sperm cell) to flow through the analyzing zone (see also below) and to analyze (sense or measure) a characteristic of the fluid comprising the sperm cell, or the sperm cell per se, (flowing) in the analyzing zone. The system may be provided with a sensor to sense the characteristics of the fluid (flowing) in the analyzing zone. Especially, the sensor comprises the herein described measuring device configured to measure a first impedance (and second impedance). The system, especially the analyzing zone, may comprise a (first) pair of electrodes to analyze a characteristic, such as the electrical impedance, of the fluid (flowing) in the analyzing zone. Additionally or alternatively, the system may comprise an optical sensor and/or an acoustical sensor to sense or analyze the characteristics of the fluid (flowing) in the analyzing zone. Based on the analysis, the sperm cell (and part of the fluid) may be directed towards a (specific) outlet in the sorting zone.

The sorting zone is especially configured to allow directing a sperm cell and/or fluid comprising the sperm cell towards an outlet, especially to separate the sperm cell from other sperm cells. Especially, the system comprises a sorting device configured to direct a sperm cell in the sorting zone to one of the outlets. Herein, directing a sperm cell to one of the outlets may comprise directing the sperm cell in the fluid flow to one of the outlets. For instance directing the sperm cell by dielectrophoretic forces or other means especially to direct (a particulate) material in a fluid. Alternatively or additionally, directing a sperm cell to one of the outlets may comprise directing the fluid comprising the sperm cell to one of the outlets. Directing the fluid (comprising the sperm cell) may e.g. comprise directing the fluid flow by means of valves or additional fluid flows or other (hydrodynamic) means especially to direct a fluid flow (comprising the sperm cell). Hence, the sorting device may comprise a device to provide dielectrophoretic forces (to the sperm cell) or other means especially to direct a particulate material, such as a sperm cell, in a fluid in the sorting zone. Especially, the system may comprise electrodes to provide dielectrophoretic forces. Alternatively or additionally, the sorting device may comprise a device to direct the fluid comprising the sperm cell to one of the outlets, e.g. by means of valves or other means especially to direct a fluid flow. Especially the sorting device may comprise a valve.

A (first) impedance as described herein especially refers to a (first) electrical impedance. Especially, the impedance as described herein may refer to the absolute electrical impedance. The (electrical) impedance is especially the response of the (volume of) fluid between the electrodes of the pair of electrodes that may be measured when a (AC or DC, especially AC) voltage (potential) difference is introduced over the (first) pair of electrodes to provide a current (flowing through the fluid, especially, between the electrodes of the pair of electrodes) (see below). Especially, an electrical signal is provided to the first pair of electrodes (and optionally a second pair of electrodes, see below). Hence, the electrical impedance is especially a response to an electrical signal provided to the electrodes of the pair of electrodes. The electrical impedance is especially affected by dielectric characteristics of the (volume of) fluid between the electrodes. Thus if a fluid flows between (the electrodes of) the pair of electrodes, the characteristics, such as the dielectric characteristics, of the volume that is measured between the electrodes may change in time, and especially the measured impedance may change in time. Hence "measuring a (first) impedance as a function of time of the fluid between the (first) pair of electrodes" comprises measuring the electrical impedance value (or signal) (response of a potential difference over the electrodes) of the fluid (including any optional sperm cell and optional other material) between the electrodes of the pair of electrodes over a time period (and determine the impedance values (signal) as a function of time in that time period). The (electrical) impedance (value/signal) is affected by the dielectric characteristics of the fluid (including a possible sperm cell or another particulate material). Hence, when an abnormal sperm cell or a sperm cell comprising a (specific) characteristic, especially a sperm cell exhibiting (abnormal) cell characteristics affecting the dielectric characteristics of the sperm cell, flows between the pair of electrodes and the (electrical) impedance is measured over time, the measured (impedance) signal may differ substantially from the one observed form a normal sperm cell or a sperm cell not comprising the (specific) characteristics and the abnormal sperm cell/sperm cell comprising the (specific) characteristics may be identified.

Especially the identification may be done in a comparison stage (or identification stage). Cell characteristics affecting the dielectric properties of a sperm cell for instance comprise alterations in the charge on the sperm membrane, charge distribution over the sperm membrane and abnormal morphology. Especially, abnormal morphology such as size variations, vacuoles in the head, or acrosome deficiency, and the presence of a cytoplasmic droplet may show a substantial effect on the measured impedance signal when the abnormal sperm cell passes between the electrodes.

The system and method described herein may be applied for detecting and sorting a sperm cell comprising an abnormal or specific characteristic affecting the dielectric characteristics of the sperm cell. Especially the system and the method may be applied for detecting and sorting a sperm cell comprising a morphological abnormality, such as a sperm cell comprising a cytoplasmic droplet. The system may also be configured for (and the method as described herein may also comprise) selecting the presence of a(nother) specific characteristic having an effect on the dielectric characteristics of a sperm cell, for instance (the presence of) abnormal dimensions of a sperm cell, abnormal vacuoles in the sperm cell, abnormalities in the acrosome, abnormalities in the charge of the sperm membrane, or (the presence of) other morphological abnormalities. Hence, especially the system of the invention may be configured to, and the method of the invention may be used for, sorting a sperm cell based on one or more characteristics. Especially, the characteristic may be selected from the group consisting of a dimension of the sperm cell, a presence of (a determined) vacuole in the sperm cell, an acrosome (deficiency) (in the sperm cell), a charge of a membrane of the sperm cell (the sperm membrane), a charge distribution over the sperm membrane, a morphology (a morphologic characteristic) (of the sperm cell), a presence of a cytoplasmic droplet, and a DNA integrity).

Here below, the system is described in more detail. The system (and method) may also be used to (only) measure or analyze sperm. Especially for analyzing sperm, the sorting device may not be applied for sorting the sperm (separating a sperm cell from another sperm cell) in the sorting zone. Especially for such application no sorting zone (and sorting device) is required. The system (and method) is especially explained in more detail for identification and sorting a morphologically abnormal sperm cell, especially a sperm cell comprising a morphology that differs from the morphology of other sperm cells.

When an abnormal sperm cell flows between the pair of electrodes and the impedance is measured over time, the measured signal may differ substantially from the one observed from a normal sperm cell. Thereby, an abnormal sperm cell (and also the normal sperm cell) may be identified and distinguished (especially in the comparison stage). Especially, the system (and the method) described herein is (configured) for identification and distinguishing a sperm cell based on a sperm cell characteristic. The identified (abnormal) sperm cell may be directed to one of the outlets by the sorting device, whereas a normal sperm cell (or sperm cell not comprising specific characteristics) may be directed to (one of) the other outlet(s). An outlet may comprise an opening for exiting the fluid flow channel. An outlet may be in fluid connection with one or more further fluid flow channels, for instance to direct the selected sperm cell to a further processing or storage stage. Alternatively or additionally, one or more of the outlets may be in fluid connection with a container, especially to contain (a fluid comprising) the sorted sperm cells. In an embodiment, one of the outlets is configured as a continuation of the fluid flow channel, while the other outlet(s) is (are) configured as a side-way or exit of the main fluid flow channel. Especially in such embodiment a default fluid flow may be provided from the inlet to the outlet configured as a continuation of the fluid flow channel and an identified sperm cell (and/or any other identified material, see below) may be removed from the main fluid flow by directing it (the identified sperm cell and/or other material) to (one of the) the outlet(s) configured as an exit. In other words, a channel axis upstream from such "continuation" outlet and a channel axis downstream therefrom may be configured substantially parallel and substantially without a mutual distance (especially substantially mutually in line with each other).

Especially, in an embodiment comprising at least three outlets, the system may further be configured for a further sorting, for instance sorting between a normal sperm cell, a sperm cell comprising a distal cytoplasmic droplet, and a sperm cell comprising a proximal cytoplasmic droplet. The sorting device may be further configured to direct the normal sperm cell to e.g. a first outlet, and the abnormal sperm cells (comprising e.g. a distal cytoplasmic droplet and a proximal cytoplasmic droplet) may be directed to one of the respective second and third outlets and optionally further outlets (based on a comparison in a comparison stage of the time dependent impedance data with predefined reference data). The outlets may all be configured at substantially the same location with respect to the fluid flow channel axis, e.g. such as in the case of a bifurcation or a trifurcation. Especially, the fluid flow channel axis comprises the longitudinal axis of the fluid flow channel. Especially, fluid exiting the different outlets may be directed in different flow directions. Especially, in such embodiment one sorting device may be configured to direct the sperm cell to either one of the outlets. Alternatively, more than one sorting device may be configured to direct the sperm cell to a specific outlet.

Additionally or alternatively, the outlets may also be arranged in series. For instance, for sorting the above mentioned three types of sperm cells it may be advantageous to first sort between a normal and the abnormal sperm cells and direct all normal sperm cells to a first outlet and all abnormal to a second outlet. The second outlet may be configured downstream of the first outlet. Downstream of the second outlet, but in the same channel as the first outlet, one or more further outlets may be configured. Alternatively or additionally, such second outlet may comprising one or more further outlets, such as a third or further outlet, configured downstream from the second outlet in another channel than the channel comprising the first and the second outlet. Different embodiments can be used for successively directing normal sperm cells to a first outlet and abnormal to e.g. a second outlet, with for instance the sperm cells comprising e.g. a distal cytoplasmic droplet to the yet a further (specific) outlet. In another embodiment, the sorting device may be configured to direct a normal sperm cell and an abnormal sperm cell, respectively, to a first and a second outlet, whereas (non-sperm cell comprising) further (particulate) material (such as cell debris) comprised in the fluid may be directed to yet another (further) outlet.

Hence, in a further embodiment the system comprises (a first outlet, a second outlet and) a further outlet, and the sorting device is further configured to sort a further particulate material by directing the further particulate material in the sorting zone to one of the (first second or further) outlets, especially based on a comparison in a comparison stage of the time dependent impedance data with predefined reference data. Especially reference data may comprise reference data for the further particulate material. Such system may especially be of relevance when the fluid further may comprise a further particulate material (in addition to sperm cells).

In embodiments, the sorting device is configured to sort sperm cells between (morphological) normal sperm cells and (morphological) abnormal sperm cells, by directing the sperm cell in the sorting zone to one of the outlets based on a comparison in a comparison stage of the time dependent impedance data with predefined reference data, wherein an abnormal sperm cell is directed to one of the outlets by the sorting device and a normal sperm cell is directed to another outlet.

The electric source may provide an alternating current to the electrodes. The electric source may also provide a direct current to the electrodes. The electronic source may also provide the electric signal comprising waves, such as a sinusoidal wave, a block wave, or a triangle or a saw tooth wave. In an embodiment the electric source is comprised in a separate electric device. In yet another embodiment the electric source may also be comprised in the measuring device (see below). In a specific embodiment an impedance spectroscope comprises the measuring device as well as the electric source. However, yet in another embodiment an electric wave generator comprises the electric source, and the measuring device comprises an impedance spectroscope.

The time-dependent impedance data provided may comprise different representations. The time-dependent impedance data may for instance in an embodiment comprise a series of data (like a table) comprising the raw measurement data, i.e., the (measurement) time and the respective measured impedance signal, especially the respective imaginary and real part of the measured signal. In another embodiment, the time-dependent impedance data may comprise a single value, such as the maximum impedance signal measured (during measuring the impedance of a fluid comprising a sperm cell) or for instance a level of impedance increase (over a specific measuring period). In a further embodiment, the time-dependent impedance data may comprise a series of data comprising the minimum and maximum measured impedance values and the respective measurement times. Yet in another embodiment, the time-dependent impedance data may comprise a graphical representation of the measured impedance versus the measurement time, especially configured as a measurement curve. In yet a further embodiment, the measured impedance values are transformed to absolute impedance data and the time-dependent impedance data may comprise the absolute values of the impedance (and the respective measurement time). Especially the absolute value of the measured impedance data may be used. Especially in embodiments the time dependent impedance data comprises the absolute values of the measured impedance signal (as a function of the measuring time). In yet another embodiment the time-dependent impedance data may comprise the real and imaginary parts of the measured impedance values. Alternatively or additionally, the measured impedance signal may be corrected for drift and/or offset in the measured data; the time-dependent impedance date may (also) comprise corrected data. In yet a further embodiment, the time-dependent impedance data comprise at least two of the above given representations (embodiments). Hence, the measuring device especially may be configured to provide different types of time-dependent impedance data, such as given in the embodiments above. The time-dependent impedance data may thus include originally measured data as well as processed data. Further, the time-dependent impedance data may include a plurality of data or optionally even a single value.

When a normal sperm cell (or another particulate material) flows between a pair of electrodes and the impedance of the fluid (comprising the sperm cell) between the electrodes is measured over time, the time-dependent impedance data may be compared to predefined reference data in different ways. In embodiments, the comparison may comprise different kind of mathematical and/or statistical data analysis known in the art. The time-dependent impedance data may comprise the (raw) measured (first) impedance data (signal) over time and may for instance directly be analyzed and compared to predefined reference data. The time-dependent impedance data may also in the comparison stage be transformed and/or visualized by techniques known in the art and compared to predefined reference data. In an embodiment, the data may be stored in a (temporary) memory and only the highest value is used to compare with predefined reference data. In another embodiment the maximum and minimum time-dependent impedance values are compared to predefined reference data, especially the difference between the maximum and minimum impedance value may be calculated (in the comparison stage) and compared to the values comprised by the predefined reference data. In yet a further embodiment, the time-dependent impedance data comprise a (corrected) measuring curve (data) and the predefined reference data may comprise a reference impedance curve of a normal sperm cell and/or a reference curve (data) of an abnormal sperm cell, and the measurement impedance curve may be compared with the reference impedance curve(s) or the data of the reference impedance curve(s). Alternatively or additionally, the measuring curve may also be provided by a best fit model of the measured data and compared to a mathematical model of a reference impedance curve of a (morphologically) normal sperm cell and/or a mathematical model of reference curve of a morphologically abnormal sperm cell or different types of morphologically abnormal sperm cells or even other particulate material. A measuring curve may be represented by data and by a graphical representation of the data. Especially, in embodiments a measuring curve may comprise data as well as a graphical representation, especially wherein the data may be used for comparison reasons and especially the graphical representation for illustrative reasons. However, in other embodiments alternatively or additionally the graphical representation may be used for comparison reasons (only).

The invention also includes embodiments using alternative comparison techniques. If the impedance is measured over time when a sperm cell passes between the electrodes, in the measured (impedance) signal (over time) an increase and a decrease in the impedance caused by the head of the sperm cell may be observed. The increase and a decrease in the impedance may (graphically) be represented by a peak. For a (morphologically) normal sperm cell a subsequent tail of the sperm cell passing between the electrodes may only have an effect on the impedance signal measured between the electrodes to a very limited degree. Hence, a morphologically normal sperm cell may substantially only show one gradual increase followed by gradual decrease in the measured (impedance) signal (over time) wherein the decrease may show some tailing. The peak may be substantially symmetric, especially when using a homogeneous electric field between the electrodes. Herein symmetric means that the peak or the curve shows symmetry about an axis, i.e. the leading edge of the peak shows approximately the same (but mirrored) shape as trailing edge of that peak. Moreover, several (morphologically) normal sperm cells may show a substantial equal measured (impedance) signal. Moreover, (measurements of) different normal sperm cells may show substantially the same shape of the measuring curve (over time), especially when the sperm cells flow substantially through the same location between the electrodes. Especially, the term "measuring curve" relates to a measured impedance signal as a function of time.

When a (morphologically) abnormal sperm cell flows between the pair of electrodes and the impedance is measured over time, the measured (impedance) signal may differ substantially from the one observed of the normal sperm cell. Especially, an abnormality in the form of the presence of a cytoplasmic droplet e.g. may show substantially the same peak in the measuring curve as shown by a normal sperm cell. However, in addition to the substantial symmetric peak, a (small) additional peak may be present in the measuring curve caused by the (extra) impedance induced by the cytoplasmic droplet. Hence, the cytoplasmic droplet may be represented by a (second) identifiable small peak. The cytoplasmic droplet may also be identified by an extra asymmetry or shoulder in the measuring curve. Especially, the second peak may be superimposed on the first peak and may be identified by a shoulder (peak) in the measuring curve. Hence, the system and method described herein allows to identify the presence of the cytoplasmic droplet and to further direct the abnormal sperm cell to another outlet of the fluid flow channel (than the one a normal sperm cell may be directed to). Especially, an abnormal sperm cell comprises a (pre)determined characteristic, especially a cytoplasmic droplet. Especially, the system and method as described herein may identify the presence of the cytoplasmic droplet based on an asymmetric measuring curve to further direct the abnormal sperm cell to one of the outlets. Especially, the system and method as described herein may identify a normal sperm cell based on a substantially symmetric measuring curve to further direct the normal sperm cell to one of the outlets, especially while directing other particulate material to another outlet.

To facilitate positioning of the sperm cells (between the electrodes), an optional focusing zone may be configured upstream of the analyzing zone. Especially, the focusing zone is configured to direct a sperm cell to a specific location in the fluid flow, especially towards a center axis of the fluid flow channel, especially towards the fluid flow channel axis (at the location of the focusing zone). Focusing sperm cells may be provided by special adaptations in the flow channel, such as small restrictions or narrowing of the flow channel. Focusing may further be provided by application of ultrasound. However it was found that sperm cells may be advantageously positioned without losing viability by subjecting the sperm cell to a non-uniform electric field. The invention thus also provides herein that positioning a sperm cell within the flow channel may be controlled by dielectrophoretic forces (in the focusing zone).

Also in the sorting zone a sperm cell may advantageously be directed to a specific outlet providing dielectrophoretic forces to the sperm cell.

Hence, dielectrophoretic forces may be provided in the focusing zone and/or in the sorting zone to direct a sperm cell. Dielectrophoretic forces may be provided especially in the sorting zone and even more especially in the focusing zone and the sorting zone.

Hence, in an embodiment the system, especially the sorting device, comprises a first electromagnetic device to provide an electric field to the sorting zone, and the first electromagnetic device is configured to direct the sperm cell by a dielectrophoretic force (dielectrophoresis) (in the sorting zone). In this way, sorting of the sperm cells may be executed.

In a further embodiment the system comprises a second electromagnetic device to provide an electric field to the focusing zone. Especially the second electromagnetic device is configured to direct the sperm cell by dielectrophoretic force, especially to the fluid flow channel axis. In this way, the sperm cells may be forced to flow e.g. substantially in the middle of the fluid flow channel axis.

For instance, the dielectrophoretic force may be provided by applying an electrical field in the MHz range using the on-chip integrated microelectrodes. Especially, cell focusing and sorting may be performed by applying a 10 MHz, $6V_{pp}$ sinusoidal excitation by the first and/or second electromagnetic device and the first and/or the second electromagnetic devices are configured to provide these excitations. Especially, a dielectrophoretic force may be provided by at least two electrodes. Especially, the electrodes may be in physical contact with the fluid (in the fluid flow channel). In an embodiment the dielectric force is provided by two electrodes, especially by applying an AC or DC electric field, especially and AC electric field, between the two electrodes. Especially, a sperm cell or other particulate material may be directed in the direction (or opposite to the direction) of the field lines of the electric field. In a further embodiment, the dielectrophoretic force is provided by four electrodes, especially a first set of two electrodes and a second set of two electrodes, especially wherein a first (AC or DC) electric field is applied between the first set of two electrodes and a second (AC or DC) electric field is applied between the second set of two electrodes. Especially, by arranging the first set of electrodes upstream from the second set of electrodes a dielectric force may be provided to direct a sperm cell. Especially, the two electrodes of the first set (of electrodes) may be configured at respectively 0° and 180° with respect to the fluid flow axis. Especially, the two electrodes of the second set (of electrodes) may be configured respectively at 90° and 270° with respect to the fluid flow channel axis. The two sets of electrodes may be configured in at least one plane perpendicular to the fluid flow channel axis. Especially, the two sets of electrodes may be configured in two planes perpendicular to the fluid flow channel axis, especially each set in one plane perpendicular to the fluid flow channel. Especially, in this way a sperm cell may be directed in a plane perpendicular to the fluid flow channel axis. Especially, a sperm cell may be directed to the fluid flow channel axis. In a further embodiment focusing is provided by ultrasound.

A (morphologically) normal sperm cell (of a bull and/or a boar) may have a size of the head of 8-9 µm in a first direction parallel to a longitudinal axis of the head, and 4-5 µm in a second direction perpendicular to the longitudinal axis, and less than 1 µm in a third direction perpendicular to the first and second direction, and a tail of 40-45 µm. A sperm cell comprising a cytoplasmic droplet may also have substantially the same dimension as the morphologically normal sperm cell, with the exception that it comprises a droplet, that normally is positioned somewhere in the middle of the tail of the sperm cell (a distal cytoplasmic droplet) or behind the head (a proximal cytoplasmic droplet). The head of a sperm cell is substantially not round but may be relatively flat, especially in the third direction. Hence, it may also be advantageous to arrange a restriction in the fluid flow channel configured to orient the sperm cell to be analyzed having the head in a specific direction. Especially, a restriction may be configured to rotate the sperm cell around its longitudinal axis. Especially, an orientation zone, comprising such restriction, may be provided in the fluid flow channel downstream of the focusing zone and upstream of the analyzing zone. Hence, in an embodiment, the system further comprises an orienting zone configured downstream from the inlet and (if present) from the optional focusing zone and upstream from the analyzing zone, wherein the orienting zone comprises at least one restriction (element) in the fluid flow channel to orient the sperm cell. Orientation may comprise rotation of the sperm cell around its longitudinal axis. Additionally or alternatively, orientation may comprise aligning (the longitudinal axis of) the sperm cell with the fluid flow channel axis at the location of the pair of electrodes, especially wherein the head of the sperm cell is arranged further downstream than the tail. Hence, orientation may comprise aligning a sperm cell with the fluid flow channel axis wherein the head of the sperm cell is arranged further downstream than the tail (of the sperm cell) and especially rotating the sperm cell around its axis to provide a substantially constant angle between the third direction of the head of the sperm cell and the electromagnetic field lines (between the pair of electrodes). It was noticed that the orientation may also be provided by dielectrophoretic forces. Hence dielectrophoretic forces may be used to direct a sperm cell to a specific direction. Alternatively or additionally dielectrophoretic forces may be applied to direct and position a sperm cell at a specific location. Especially, a focusing zone comprising an electromagnetic device configured to direct a sperm cell may also provide orientation of the sperm cell. Hence, the functionality of the (optional) orienting zone may also be comprised in the (optional) focusing zone. Especially in an embodiment, the second electromagnetic device (to direct a sperm cell in the focusing zone) is further configured to orient the sperm cell (in the focusing zone).

The measured impedance signal may be sensitive to small disturbances (noise), present internally in the system as well as disturbances (noise) present externally from the system. For instance small fluctuations in the conductivity of the fluid, in the electrical signal provided to the electrodes, or fluctuations of any electromagnetic radiation externally from the system all may have an effect on the measured impedance signal. Hence, it may be advantageous to provide a second pair, or even further pairs, such as a third, a forth, a fifth or even a tenth pair, of electrodes (downstream of the first pair of electrodes) in the analyzing zone and to measure the impedance at successive locations in the analyzing zone. It may be advantageous if a pair of electrodes comprises one primary electrode to connect to the electric source and one measuring electrode to connect to the measuring device. However, the phrase "pair of electrodes" (or "pair") does not only refer to "two" electrodes. A pair of electrodes may also refer to a pair of electrodes comprising one primary electrode and two or more measuring electrodes. Likewise, two pairs of electrodes may comprise only one (mutual) primary electrode and two measuring electrodes. A pair of electrodes may further refer to one or more primary electrodes and one or more measuring electrodes. Especially, a primary electrode may be comprised by one or more pairs of electrodes. Especially, using two (or more) pairs of electrodes, the time-dependent impedance data (for a sperm cell) may be provide based on the measured impedance signals between the first pair of electrodes and the measured impedance signal between the second pair of electrodes (and if present also between the further pairs of electrodes). If two (or more) pairs of electrodes are used in the system, a sperm cell may be detected multiple times and extra information on the sperm cell may be generated that may be used to reduce the effect of noise. The measured impedance signals of the two or more pairs of electrodes may for instance be averaged to provide the time-dependent impedance data (using different time stamps to correct for the time required to flow from the first pair of electrodes to the successive pair(s) of electrodes) to remove part of the noise and/or to improve a possible base line correction (drift). It, however, was surprisingly found that by using two pairs of electrodes and performing differential measurements, the effect of systemic errors may substantially be decreased compared to separate impedance recordings. By (differentially) subtracting the signals of the two pairs of electrodes (wherein data-points measured at the same time at the first pair and the second pair of electrodes are subtracted from each other), a systemic error which is present within the impedance spectroscopy may be resolved. Especially, by (differentially) subtracting the signals a differential signal time-dependent impedance data may be provided. Using a differential signal, a passing sperm cell may be represented in a (time-dependent impedance data configured as) measuring curve by a positive peak (comprising positive differential impedance values) followed by a negative peak (comprising negative differential impedance values). The shape of the measuring curve (or any other kind of time-dependent impedance data based on a difference between the measured data of the first and the second pair of electrodes) may than contain information about the presence of an abnormality, especially a sperm cell comprising an abnormal morphology, such as especially a cytoplasmic droplet. A (morphologically) normal sperm cell may show a positive and a negative peak caused by the head of the sperm cell in the measuring curve (the differential signal). Especially the negative peak may exhibit peak tailing caused by the tail of the sperm cell (for a sperm cell traveling head first between the electrodes). However, a sperm cell comprising a morphological abnormality, such as a cytoplasmic droplet, may show an additional shoulder (or additional peak) between the negative peak and the tailing of the negative peak of the (impedance) differential signal. Especially, differentially subtracting comprises subtracting a (second) data-point measured at a time at the second pair of electrodes from a (first) data-point measured at said time at the first pair of electrodes (or vice versa). Of course, this may be done for a plurality of second data points and first data points.

Hence, in a specific embodiment, the invention further provides the system, wherein the analyzing zone further comprises a second pair of electrodes comprising a second intra-electrode distance and configured at an inter-electrodes distance from the first pair of electrodes, and wherein (i) the electric source is configured to further provide an electric signal to the second pair of electrodes; and (ii) the measuring device is further functionally coupled to the second pair of electrodes and configured to further measure a second impedance as a function of time of the fluid between the second pair of electrodes and configured to provide the time-dependent impedance data based on the first impedance and the second impedance. The inter-electrodes distance is especially defined as the shortest distance between the first pair of electrodes and the second pair of electrodes.

The first pair of electrodes are especially configured at two opposite sides of the flow channel, with the flow channel in between. Likewise, the second pair of electrodes are especially configured at two opposite side of the flow channel, with the flow channel in between. Especially, the distance between one electrode of a pair of electrodes and the fluid flow channel axis is equal to the distance between another electrode of the pair of electrodes and the fluid flow channel axis. The first pair of electrodes and the (optional) second pair of electrodes are especially configured to be in physical contact with a fluid flowing between the electrodes. The electrodes of the pairs of electrodes comprise electrical conductive material, such as a metal or another conductive material. Especially, the electrodes may comprise one or more metals selected from the group consisting of iron, copper, aluminum, gold, silver, nickel, platinum, titanium, tantalum, tin, and alloys thereof. In an embodiment, the electrodes comprise platinum and/or titanium. In a further embodiment, the electrodes (also) comprise tantalum and/or titanium. Alternatively or additionally, the electrodes may (also) comprise graphite.

Especially, this embodiment may advantageously be combined with an embodiment wherein the time-dependent impedance related data are based on a difference between an absolute value of the first impedance at a time and an absolute value of the second impedance at said time. However, in another embodiment, the time-dependent impedance may be based on the average values of the measured (impedance) signals of the first and the second pair of electrodes.

The time-dependent impedance data based on two pairs of electrodes may comprise substantially the same data as provided with only one pair of electrodes. Moreover, the time-dependent impedance data provided in an embodiment comprising two pairs of electrodes may comprise the data based on the first pair of electrodes, data based on the second pair of electrodes, and processed data based on the measuring data of the first and the second pair of electrodes.

Also the predefined reference data in an embodiment comprising two pairs of electrodes may comprise the same reference data based on only one pair of electrodes, especially the predefined impedance data based on two pairs of electrodes may comprise the reference data with respect to the first pair of electrodes, the reference data with respect to the second pair of electrodes, and reference data with respect to processed data of the first and the second pair of electrodes. Hence by predefining the reference data based on the representation of the time-dependent impedance data, the (method for) sorting of sperm cells in an embodiment comprising one pair of electrodes and an embodiment comprising two pairs of electrodes is substantially the same. Especially, the reference data may contain information (allowing) to sort between sperm cells based on a characteristic, especially to sort between morphologically normal sperm cells and sperm cells comprising a morphological abnormality, such as a cytoplasmic droplet. Especially, the reference data may also contain information to sort between a sperm cell and one or more other particulate materials. Hence in an embodiment the reference data contain information on the presence and/or absence of a morphological abnormality. In a further embodiment, the reference data contain information on the presence and/or absence of a cytoplasmic droplet. In a further embodiment the reference data contain information on a (further) characteristic of sperm cells. In yet a further embodiment, the reference data contain information on a particulate material, especially debris. Further, the reference data may include information on a deviation from reference data within which a species to be sorted belongs to a specific class (such as normal sperm or abnormal sperm) or outside which a species to be sorted does not belong to a specific class (such as abnormal sperm or normal sperm). Especially a characteristic of an abnormal sperm cell may differ from that characteristic of a normal sperm cell (as are known by the person skilled in the art).

Hence, in an embodiment, the invention provides a system for sorting a sperm cell in a fluid, especially a system for performing sperm cell analysis and selection based on a sperm cell characteristic of sperm cells, especially based on sperm cell morphology of sperm cells, the system comprising: (i) a fluid flow channel for transport of said fluid, the fluid flow channel comprising an inlet, an analyzing zone configured downstream from said inlet and comprising a first pair of electrodes comprising a first intra-electrode distance and a second pair of electrodes comprising a second intra-electrode distance and configured at an inter-electrodes distance from the first pair of electrodes, a sorting zone configured downstream from said analyzing zone, (at least two) outlets configured downstream from said sorting zone, and optionally a focusing zone configured downstream from said inlet and upstream from said analyzing zone; (ii) an electric source configured to provide an electric signal to the first pair of electrodes and an electric signal to the second pair of electrodes; (iii) a measuring device functionally coupled to the first pair of electrodes and the second pair of electrodes and configured to measure a first impedance as a function of time of the fluid between the first pair of electrodes and to measure a second impedance as a function of time of the fluid between the second pair of electrodes, and to provide time-dependent impedance data based on the first impedance and the second impedance; (iv) a sorting device configured to sort sperm cells by directing the sperm cell in the sorting zone to one of the outlets based on a comparison in a comparison stage of the time dependent impedance data with predefined reference data.

The system may be applied for analyzing and sorting a sperm cell in a fluid. The system may especially be applied for analyzing a sperm cell in a fluid. Especially for the target of analyzing a sperm cell in a fluid, the sperm cell may not necessarily have to be sorted. Hence the invention also provides in a further aspect a system for analyzing a sperm cell in a fluid, the system for analyzing a sperm cell comprising: (i) a fluid flow channel for transport of said fluid, the fluid flow channel comprising an inlet, an analyzing zone configured downstream from said inlet and comprising a first pair of electrodes comprising a first intra-electrode distance and (optionally) a second pair of electrodes comprising a second intra-electrode distance and configured at an inter-electrodes distance from the first pair of electrodes, (an outlet configured downstream from said analyzing zone), and optionally a focusing zone configured downstream from said inlet and upstream from said analyzing zone; (ii) an electric source configured to provide an electric signal to the first pair of electrodes and (optionally) an electric signal to the second pair of electrodes; (iii) a measuring device functionally coupled to the first pair of electrodes and (optionally) to the second pair of electrodes and configured to measure a first impedance as a function of time of the fluid between the first pair of electrodes and (optionally) to measure a second impedance as a function of time of the fluid between the second pair of electrodes, and to provide time-dependent impedance data based on the first impedance and (optionally) the second impedance; and wherein the sperm cell is analyzed based on a comparison in a comparison stage of the time dependent impedance data with predefined reference data. Especially, analyzing may comprise determining characteristics of sperm cells, especially the amount of morphologically abnormal sperm cells in sperm. Especially, the system (especially the system for analyzing a sperm cell in a fluid) comprises a system for performing sperm cell analysis, especially based on a characteristic of a sperm cell, especially sperm cell morphology of sperm cells.

The dimensions of the systems described herein may especially be configured to transport a fluid comprising a sperm cell and position the sperm cell, especially in the center of the flow channel, especially at the fluid flow channel axis in the focusing zone.

The electrodes, further are especially configured not to obstruct the fluid flow in the flow channel. It may be advantageous to incorporate the electrodes in a wall of the fluid flow channel, or in two walls at opposite sides of the fluid flow channel axis. In an embodiment, the electrodes are integrated in the wall of the flow channel (in the analyzing zone). Especially, the electrodes are micro-electrodes. In a further embodiment a small region of a wall of the fluid flow channel is removed by etching and replaced by a metal or another electrically conducting material configured as an electrode to provide an (in the wall) integrated (micro) electrode. In an embodiment at least two small regions of the wall of the fluid flow channel are removed by etching and replaced by a conducting material configured as electrodes to provide (in the wall) integrated (micro) electrodes.

Electrodes that provide a pair of electrodes may especially be configured at an intra-electrode distance allowing a sperm cell to pass. Especially an electrode may comprise a width, a length and a height. Herein the intra-electrode distance is the smallest distance between electrodes of a pair of electrodes. However, a large intra-electrode distance may have a negative effect on the sensitivity of the measurement. Hence, an intra-electrode difference, preferable is in the range from larger than (once) the size of the head of a sperm cell and not larger than 5 time the size of a head of a sperm cell. Especially, the intra-electrode distance between a pair of electrodes is in the range of 5-400 µm, especially 5-20 µm. Hence, in an embodiment the invention provides the system, wherein the first intra-electrode distance is selected from the range of 5-400 µm, especially in the range from 5-20 µm. In a further embodiment the second intra-electrode distance is also selected from the range of 5-400 µm, especially in the range from 5-20 µm. Especially, in embodiments comprising a second pair of electrodes, the first intra-electrode distance and the second intra-electrode distance are selected to be substantially the same. In an embodiment the first intra-electrode distance and the second intra-electrode distance are substantially the same, especially the first intra-electrode distance and the second intra-electrode distance are substantially 10 µm. In another embodiment, the first intra-electrode distance and the second intra-electrode difference are substantially 20 µm. In yet another embodiment, the first intra-electrode distance and the second intra-electrode difference are not the same. In a specific embodiment, the wall of the fluid flow channel (in the analyzing zone) comprises the electrodes. Especially in such embodiment the (first and second) intra-electrode distance may be equal to a specific dimension of the fluid flow channel, such as a height, or a width or a diameter of the fluid flow channel.

The fluid flow channel described herein, may comprise a cross section (of the fluid flow channel and open for fluid flow) perpendicular to the fluid flow channel axis and comprises a first dimension of the fluid flow channel and a second dimension of the fluid flow channel perpendicular to the first dimension.

In embodiments, the fluid flow channel may comprise a circular cross section or a substantially square cross section. Especially, the first dimension and the second dimension of the fluid flow channel may substantially be the same.

The first dimension and the second dimension of the fluid flow channel may also differ from each other and the cross section may e.g. comprise a rectangular, or even another kind of shaped cross selection.

Especially, the intra-electrode distance is configured to be substantially equal to or be smaller than the first dimension of the fluid flow channel and/or the second dimension of the fluid flow channel (at the location of the pair of electrode).

The fluid flow channel is especially configured to transport sperm cells, see before. Hence, the minimum (cross sectional) dimensions of the fluid flow channel must allow a sperm cell to pass. Hence the first dimension of the fluid flow channel and the second dimension of the fluid flow channel are at least selected to allow a sperm cell in the fluid flow channel. The fluid flow channel further may comprise restrictions or other means to focus or orient a sperm cell. Hence, especially the first dimension of fluid flow channel is selected in the range of 5-400 µm, especially in the range of 5-200 µm, especially 5-100 µm, such as 10-20 µm. The second dimension of the fluid flow channel is selected in the range 5-400 µm, especially in the range 5-200 µm, especially 5-100 µm, such as 10-20 µm. Hence in an embodiment, the invention provides the system, wherein the first dimension of the fluid flow channel is selected from the range of 5-400 µm and the second dimension of the fluid flow channel is selected in the range 5-400 µm. Especially, the cross-sectional area (of the fluid flow channel) is at least 100 µm$^2$, such as in the range of 100-10.000 µm$^2$. The different zones (analyzing zone, sorting zone, and optional focusing zone, and orienting zone) in the flow channel may (all) comprise dimensions differing from each other. Especially, however, the dimensions (of the cross section) of a first zone at the most downstream side of the first zone may be substantially equal to the dimensions (of the cross section) at the most upstream side of a second zone contacting the first zone and arranged downstream of the first zone. The terms "first dimension" and "second dimension" especially refer to height and width, respectively. Would the fluid flow channel have a square or circular cross-section, then the first dimension and second dimension would be identical.

For a small distance between the pairs of electrodes a significant part of a sperm cell, such as the head of the sperm cell, may be present between (or detected by) the first pair of electrodes as well as between the second pair of electrodes. The impedance measurement between the first pair of electrodes may affect the impedance measurement between the second pair of electrodes, and vice versa. Especially the inter-electrode distance is the shortest distance between (an electrode of) the first pair of electrodes and (an electrode of) the second (or further) pair of electrodes. Especially, if the first pair of electrodes and the second pair of electrodes comprise the same (mutual) (counter) electrode the inter-electrode distance is the shortest distance between an electrode, not being the mutual electrode, of the first pair of electrodes, and an electrode, not being the mutual electrode, of the second (or further) pair of electrodes. Large inter-electrode distances do require a more extending analyzing zone and may give loss of information because the measurements may become more sensitive to drift. Large inter-electrode distances may also require a reduced throughput, especially when performing differential measurements. Especially it may be advantageous if the two pairs of electrodes are configured at an inter-electrode distance wherein the measurement of the first impedance does not affect the measurement of the second impedance, especially wherein the distance between the two electrodes is minimized. Hence in an embodiment the inter-electrodes distance is selected from the range of 10-100 µm, especially 15-60 µm, such as about 20-40 µm.

The chip may especially be a PDMS chip. Therefore, the fluid flow channel may be comprised by a (PDMS) chip.

In a second aspect, the invention provides a method for sorting sperm cells, especially between sperm cells comprising a (determined) characteristic and sperm cells not comprising the (determined) characteristic, especially between (morphological) normal sperm cells and (morphological) abnormal sperm cells, wherein the method for sorting sperm cells comprises: providing a fluid flow comprising a sperm cell into a fluid flow channel, wherein the fluid flow channel comprises a first pair of electrodes; optionally focusing the sperm cell in the fluid flow channel; providing an electrical signal to the first pair of electrodes and measuring a first (electrical) impedance (signal) as a function of time of the fluid between the first pair of electrodes to provide time-dependent impedance data; and sorting the sperm cells based on comparing the time-dependent impedance data with predefined reference data in a comparison stage. Especially soring may comprise physically separating sperm cells. Especially, sorting is based on a characteristic of a sperm cell, especially for determining a morphology of the sperm cell. Hence, the method is an ex vivo method.

In the method, the (electrical) impedance (signal) is measured. Especially the time-dependent impedance data comprises the first impedance as a function of time. Consequently, the sperm cells may be sorted based on comparing the time-dependent impedance data with predefine reference data, especially pre-defined reference data comprising characteristics of an abnormal sperm cell and characteristics of a normal sperm cell. Especially, sorting the sperm cells (between an abnormal and a normal sperm cell) may be based on comparing (the symmetry of) a measuring curve comprising the time-dependent impedance data with (the symmetry of) a symmetric curve. Especially sorting the sperm cells may comprise sorting between a sperm cell not comprising a cytoplasmic droplet and a sperm cell comprising a cytoplasmic droplet. Hence, the invention provides a method including (a) an optional focusing stage, (b) an analyzing stage, (c) a comparison stage, and (d) optionally a sorting stage, wherein in the analyzing stage the sensor device as described herein is applied, especially the sensor device comprising the measuring device configured to provide time-dependent impedance data.

Especially, the method may comprise using the system for sorting a sperm cell as described herein. Especially, the system for sorting a sperm cell may comprise the method described herein.

In an embodiment the fluid comprises boar sperm cells. In another embodiment, the fluid comprises cattle sperm cells, especially bull sperm cells. Especially, the fluid in the method and the system for sorting sperm cells as described herein may comprise sperm cells in a concentration of $2 \cdot 10^3$-$2 \cdot 10^8$ cells/ml.

Impedance spectroscopy is known in the art for label-free analysis of adherent cells or cells in suspension. This technique has been used extensively to investigate the dielectric properties of cells in microfluidic systems. When a sperm cell is introduced between a pair of electrodes, the capacitive and resistive properties will be altered by the cell membrane (capacity) and the cell's cytoplasm (resistance$_{cyt}$), respectively. A significant effect of a double layer on the absolute impedance may be shown. Due to a small electrode surface area, the impedance may decreases over a broad frequency range. However, based on the properties of the electrodes, flow channel and the fluid (comprising a sperm cell), at a specific frequency a resistive plateau may be formed. It was shown that in the system and the method as described herein a measurement frequency of 1.3 MHz is an appropriate choice for sperm impedance analysis in this setup. In an embodiment, the method is provided, wherein measuring the impedance comprises measuring the impedance at a frequency of 1.3 MHz. It further may be advantageous to apply multiple frequencies at the same time, especially frequencies that do not interfere with each other. Hence in an embodiment the method is provided, wherein measuring the impedance comprises measuring the impedance at a frequency selected from the range of 10 kHz-100 MHz. Herein, the term "frequency" may also relate to a plurality of (different) frequencies.

The sperm cell in the fluid flow may be directed, especially towards the center of the fluid flow channel, especially to the fluid flow channel axis. Especially directing (focusing) the sperm cell in the center of the fluid flow channel may improve the reproducibility of the method. Directing a sperm cell may comprise directing the sperm cell in the fluid flow. It also may comprise directing the fluid flow including the sperm cell. Hence in an embodiment of the method focusing the sperm cell comprises providing a further fluid flow of a directioning liquid into the fluid flow channel. Moreover, in an embodiment the system further comprises one or more further inlets in the focusing zone configured to provide a further flow of a directioning liquid in the fluid flow channel. Providing a further directioning liquid may advantageously also dilute the fluid in the fluid flow channel. Especially, in a more diluted fluid sperm cells may be transported further apart (in a longitudinal direction in the flow channel) from each other which may positively affect the measurement. Alternatively or additionally, the sperm cell may be directed in the fluid, especially by applying dielectrophoretic forces on to the sperm cell. Hence, in a further embodiment a non-uniform electric field is provided to the focusing zone, and focusing the sperm cell comprises providing a non-uniform electric field to the sperm cell to direct the sperm cell in the fluid flow. Especially, a non-uniform electric field comprises a dielectrophoretic force.

Especially, a non-uniform electric field may also be used to direct a sperm cell in the sorting zone to either one of the outlets of the fluid flow channel. Hence, in a further embodiment of the method, directing the sperm cell in the sorting zone comprises providing a non-uniform electric field to the sperm cell to redirect the sperm cell in the sorting zone.

In an advantageous embodiment the method may comprise measuring the (electric) impedance (signal) at two locations in the fluid flow channel and using the signal of the two locations to sort sperm cells. Hence in a further embodiment, the invention provides the method, wherein the fluid flow comprising a sperm cell is provided into the flow channel and the flow channel comprises the first pair of electrodes and a second pair of electrodes, and wherein the method further comprises providing an electrical signal to the second pair of electrodes and measuring a second impedance as a function of time of the fluid between the second pair of electrodes; and providing the time-dependent impedance data based on the first impedance and the second impedance.

When using two electrode pairs, it may be advantageous if the time-dependent impedance data comprises a differential signal (curve) (also see above) and to sort based on the differential signal (curve) (data). Hence, in an embodiment, the time-dependent impedance data comprise differential signal (curve) data wherein the differential signal (curve) data are provided by subtracting the second impedance as a function of time from the first impedance as a function of said (same) time, and the predefined reference data comprise reference data based on a differential signal (curve) data of normal sperm cells and reference data based on a differential signal (curve) data of abnormal sperm cells.

It was surprisingly found that by systematically processing the differential signal curve data, morphologically abnormal sperm cells, especially comprising a cytoplasmic droplet, may be separated from morphological normal sperm cells. It was found that, especially after processing the differential signal curve (providing a processed differential signal curve) an area under the processed differential signal curve of sperm cells comprising a cytoplasmic droplet significantly differed from the area under the processed differential signal curve of normal sperm cells. As mentioned above, here reference is made to a measuring curve and an area; as will be understood also the measuring signal (data points) may be used, processed and be integrated over a specific measuring time to end up with a value comparable to the above mentioned area. However, to explain the embodiment, a more graphical interpretation is given by using the terms curve, peak, etc. Comparing the area under the processed differential signal (curve) as mentioned in the embodiment of the method comprises the following steps:

subtracting the measured (absolute values of the impedance) signal (data-points) of the second pair of electrodes at a certain (measuring) time from the measured (absolute values of the impedance) signal (data-points) of the first pair of electrodes at the same (measuring) time, over a relevant period of time (wherein the relevant period of time is selected and may be the time period in which a presence of a sperm cell is measured by the first and/or the second pair of electrodes) to provide differential signal time-dependent (impedance) data (impedance versus measuring time) (graphically represented by a differential signal curve comprising a positive peak and a negative peak);

determining B, wherein B is the minimum (impedance) signal value (or the peak "height" of the negative peak) of the differential signal time-dependent data;

determining the (second) measuring time where the differential signal time-dependent impedance value equals zero (graphically the time where the first (positive) peak ends and the second (negative) peak starts) and the corresponding measuring time at B (the measuring time at the minimum of the differential signal time-dependent impedance value); and calculate $X_B$, as the difference of these time values;

processing the differential signal time-dependent data by dividing all impedance values by B, and all measured time values by $X_B$, providing the processed differential signal data and graphically the processed differential curve;

calculating the area under the processed differential signal curve (of the negative peak) as the integral from the processed measuring time where the impedance equals zero (for the second time) (viz. at the start of the second peak) to the processed measuring time where the impedance equals zero for the third time (viz. the end of the second peak) of all processed differential impedance signal values.

Especially, comparing the area under the processed differential signal curve (as defined above) as time-dependent impedance data with (known) reference data for the area under the processed differential signal curve for (morphologically) normal and (morphologically) abnormal sperm cells may be the basis in an embodiment of the method for sorting sperm cells.

Herein the method comprises at least (the use of) one pair of electrodes and time-dependent impedance data based on measuring at least a first impedance as a function of time of the fluid and analyzing and sorting based on the time-dependent impedance data. Additionally or alternatively, the method may comprise the use of an optical sensor and/or an acoustical sensor to sense a characteristic of the fluid (comprising a sperm cell) to provide (further) information to sort the sperm cell (using optical and/or acoustical means). Terms like "sensor" and "device" may also refer to a plurality of sensors or devices, respectively.

In another aspect the invention also provides a method for analyzing a sperm cell in a fluid, the method comprising: (i) providing a fluid flow comprising the sperm cell into a fluid flow channel, wherein the fluid flow channel comprises a first pair of electrodes and optionally a second pair of electrodes; (ii) providing an electrical signal to the first pair of electrodes and optionally to the second pair of electrodes and measuring a first impedance as a function of time of the fluid (flowing) between the first pair of electrodes and optionally a second impedance as a function of time of the fluid (flowing) between the second pair of electrodes to provide time-dependent impedance data; and (iii) comparing the time-dependent impedance data with predefined reference data in a comparison stage.

In another aspect of the invention, the method as described herein is used to improve the viability of sperm, especially wherein the reference data contain information on the presence and/or absence of a cytoplasmic droplet. Especially the method may be used to improve the viability sperm of farm animals, especially sperm of pigs (boars) and sperm of cattle (bulls). In further embodiments one or more (other) characteristic of the sperm cells is used to improve the viability of sperm. Especially the reference data may contain information on one or more (other) characteristics. Hence, in another aspect, the invention also provides purified cattle (and pig) sperm having less than 10% sperm cells with cytoplasmic droplet relative to the total number of sperm cells, especially purified cattle (and pig) sperm obtainable by the method described herein.

BRIEF DESCRIPTION OF THE DRAWINGS

Embodiments of the invention will now be described, by way of example only, with reference to the accompanying schematic drawings in which corresponding reference symbols indicate corresponding parts, and in which.

Corresponding reference symbols used in the description and in the figures indicate the same or corresponding parts. The schematic drawings are not necessarily on scale.

DETAILED DESCRIPTION OF THE EMBODIMENTS

The method and the system of the invention as described herein are especially based on several functions that may advantageously be combined in different embodiments. The main function, especially, comprises a system and a method for analyzing a characteristic of a sperm cell flowing in a fluid channel, especially analyzing the sperm cell for abnormalities. Especially, analyzing comprises analyzing the impedance measurements performed with electrodes provided in the flow channel at an analyzing zone, wherein the impedance of a flowing fluid comprising the sperm cell over time is used to provide time-dependent impedance data, for instance comprising (a shape of) an impedance measuring curve. The time-dependent impedance data may be provided using one pair of electrodes as well as using two pairs of electrodes or using further pairs of electrodes. Herein a shape of an impedance measurement curve may indicate morphological properties (or other characteristics) of the individual cell passing by the electrodes or it may indicate other (particulate) material passing the electrodes. Especially this functionality may be combined with a second functionality, i.e. a sorting to redirect a (abnormal) sperm cell downstream of the analyzing zone when a specific parameter (characteristic) of that sperm cell, such as a (morphological) abnormality is identified. However, the system and method may also be used to analyze (or identify) only, without performing a sorting or separating action. A third functionality comprises focusing, wherein a sperm cell flowing in the flow channel may be directed to a specific location in the fluid channel, especially to substantially standardize the location of the sperm cell when it enters/is present in the analyzing zone. This focusing may for instance comprise ultrasound, dielectrophoresis, or the use of different liquid streams (hydro-dynamic focusing). The system and the method may be used for instance for identifying the presence and/or absence of sperm cells comprising a cytoplasmic droplet wherein the method is used to improve the viability of sperm. Using the system and/or the method described herein may provide purified (cattle or pig) sperm having less than 10% sperm cells with cytoplasmic droplet relative to the total number of sperm cells.

Figure 1A:
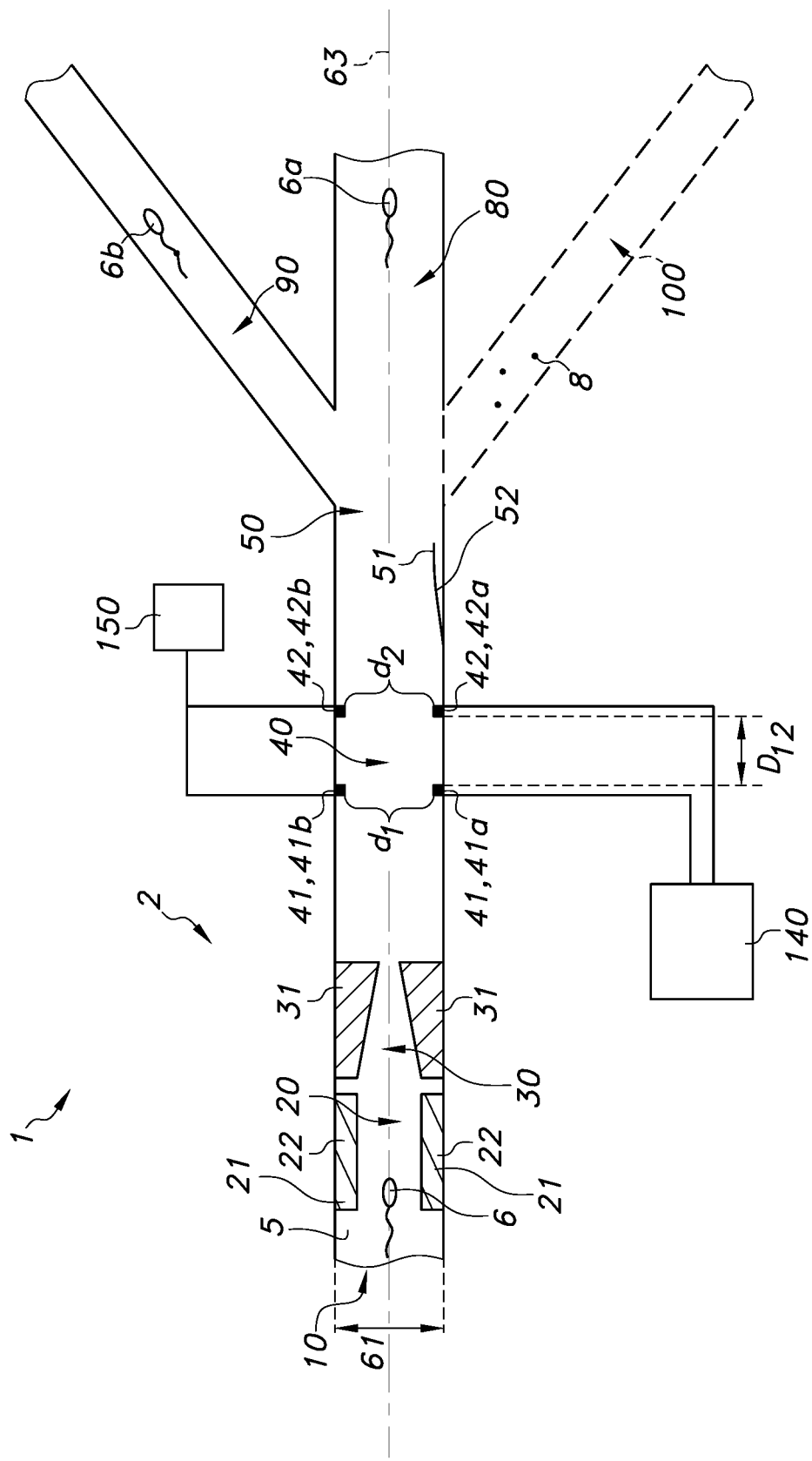
FIGS. 1a-1b schematically depict the system for sorting a sperm cell.

FIG. 1a schematically depicts an embodiment of the system 1 for sorting a sperm cell 6 in a fluid 5 according to the invention. The system 1 comprising a fluid flow channel 2 with a first dimension 61 of the flow channel perpendicular to the flow channel axis 63 for transport of the fluid 5, wherein the fluid flow channel 2 comprises an inlet 10, an analyzing zone 40 downstream from the inlet 10, a sorting zone 50 downstream from the analyzing zone 40, and outlets 80, 90, 100, . . . configured downstream from the sorting zone 50. The system comprises at least two outlets 80, 90 (sometimes also referred herein by a first outlet and a second outlet), especially to sort between a normal sperm cell 6a and an abnormal sperm cell 6b (e.g. comprising a cytoplasmic droplet). The system may advantageously also comprise at least one further outlet 100, depicted with dashed lines in FIG. 1a. A third outlet 100 may for instance be used for a further particulate material 8, such as debris to be directed to. Directing a further particulate material to a further outlet 100 may be based on a comparison of the time dependent impedance data with predefined reference data. The predefined reference data may be based on data for the further particulate material 8. The predefined reference data may also be based on data for sperm cells 6. Especially for that comparison the time dependent impedance data may comprise comparing the data with reference data for sperm cells and determining the absence of sperm cells. The depicted system 1 also comprises an optional focusing zone 20 downstream from the inlet 10 and upstream from the analyzing zone 40 and also an optional orientation zone 30 to orient the sperm cell 6, between the (optional) focusing 20 zone and the analyzing zone 40, wherein a sperm cell 6 may be oriented, by at least one restriction element 31 as depicted in the embodiment. In other embodiments the orientation zone 30 may comprise other elements to orient the sperm cell 6. In yet further embodiments, focusing and orienting may be provided in combination in one zone, for instance if focusing is provided by dielectrophoretic forces (see below). Embodiments of the system 1 may comprise one pair of electrodes 41 or two pairs of electrodes 41, 42, respectively or yet more (pairs of) electrodes, wherein a pair of electrodes may comprise exactly two electrodes, but also more than two electrodes, especially comprising a primary electrode and at least one measuring electrode. In embodiments comprising more than one pair of electrodes also the primary electrode of a pair of electrodes may be comprised in more than one pair of electrodes. In an embodiment comprising a first pair of electrodes 41 and a second pair of electrodes 42 for instance the first pair of electrodes may comprise a primary electrode and a measuring electrode, and the second pair of electrodes may comprise the same primary electrode and another measuring electrode. The embodiment depicted in FIG. 1a comprises two pairs of electrodes 41 and 42 in the flow channel 2, both comprising respectively a primary 41a, 42a and a measuring electrode 41b, 42b. The first pair of electrodes 41 comprises a first intra-electrode distance $d_1$ (between the primary 41a and the measuring electrode 41b) and a second pair of electrode 42 comprising a second intra-electrode distance $d_2$, wherein the two pairs of electrodes are configured at an inter-electrodes distance $D_{12}$ (being the smallest distance between the electrodes 41a and 42a, as well as the smallest distance between the electrodes 41b and 42b) apart from each other. Especially the first intra-electrode distance $d_1$ may substantially be equal to the second intra-electrode distance $d_2$. Especially if the electrodes are configured in the wall of the fluid flow channel, the (first and second) intra-electrode distance $d_1$, $d_2$ may also be equal the first dimension 61 of the fluid flow channel 2 and/or the second dimension 62 of the fluid flow channel 2.

In a specific embodiment (not shown, however, that may be explained with the embodiment depicted in FIG. 1a) the first pair of electrodes 41 and the second pair of electrodes 42 may comprise one mutual electrode. For instance the first pair of electrodes would comprise a first electrode 41a of the first pair of electrodes 41 being the mutual electrode and a second electrode 41b of the first pair of electrodes 41 and the second pair of electrodes 42 would comprise a first electrode of the second pair of electrodes 42 being the mutual electrode 41a and a second electrode 42b of the second pair of electrodes 42. In such an embodiment, the inter-electrode distance $D_{12}$ is defined as the shortest distance between the electrodes of the two pairs of electrodes, not being the mutual electrode, especially in this example being the distance between 41b and 42 b.

To perform impedance measurements an electric source 140 is connected to the electrode(s) (41 alone or) 41,42 to provide an electric signal to one of the electrodes 41a, 42a of a pair of electrodes 41,42 (in embodiments at least to the first pair of electrodes 41, but in other embodiments—like the one in FIG. 1a—also to the second pair of electrodes 42). Also a measuring device 150 is functionally coupled to electrodes (41 or) 41, 42 that are provided with the electrical signal to measure an impedance as a function of time of the fluid 5 (optionally comprising the sperm cell 6) between the pair of electrodes (depending on the number of pairs of electrodes (41 or) 41, 42 either to measure a first impedance as a function of time or a first impedance as a function of time and a second impedance as a function of time) to provide time-dependent impedance data. When using only the first pair of electrodes 41, the time-dependent impedance data is based on the measured impedance as a function of time between the first pair of electrodes 41, whereas the time-dependent impedance data is based on the measured impedance as a function of time between the first pair of electrodes 41 and the measured impedance as a function of time between the second pair of electrodes 42 when the system comprises two pairs of electrodes 41, 42.

Terms like "outlets 80,90, . . . " and "outlets 80,90, 100 . . . " especially indicate at least two outlets, though more are possible, and at least three outlets, though more are possible, respectively.

The sorting device 51 is especially configured to sort sperm cells 6 by directing the sperm cell 6 in the sorting zone 50 to one of the outlets 80, 90, 100 . . . based on a comparison in a comparison stage of the time-dependent impedance data with predefined reference data. Using the embodiment given in FIG. 1a, sorting for instance may be done by comparing the time-dependent impedance data (based on the first impedance as a function of time and a second impedance as a function of time) to the reference data (also based on reference data of the two pairs of electrodes) to sort sperm cells 6. Sorting in the sorting zone 50 may be provided in different ways by the sorting device 51. In an embodiment the sorting device comprises a valve, and sorting may be provided by the valve controlling the flow to one of the outlets 80, 90 (or to one of the one or more optional further outlets 100). Sorting may also comprise dielectrophoretic sorting, where an external electrical field is applied to direct the sperm cell 6 in the fluid flow 5. In the embodiment depicted in FIG. 1a sorting is provided by an electrical field provided by the first electromagnetic device 52, wherein the sperm cells 6 are directed by dielectrophoretic force. Sorting is based on comparing the time-dependent impedance data with reference data. Especially the reference data may comprise information on morphologically normal and morphological abnormal sperm cells 6, including information on sperm cells 6 comprising a cytoplasmic droplet, to sort (morphological) normal sperm cells 6a from (morphological) abnormal sperm cells 6b by comparing the reference data with the time-dependent impedance data in the comparison zone 50 in the comparison stage.

Preferably, (sequentially passing) sperm cells 6 are all located in the substantially the same location at the moment they enter the analyzing zone 40. To enable positioning (focusing), especially at the fluid flow channel axis 63, the sperm cells 6 in the focusing zone 20 are especially directed by a focusing device 21 to the fluid flow channel axis 63. The focusing functionality may be provided by dielectrophoretic forces provided by a second electromagnetic device 22 as is depicted in FIG. 1a. However focusing may also be performed by means of hydrofocusing, wherein the system 1 comprises at least one further inlet configured to provide a further fluid flow of a support material into the fluid flow channel 2 in the focusing zone 20 and the fluid comprising the sperm cells 6 is enveloped by the support material wherein the fluid comprising the sperm cell 6 is directed towards the center of the fluid flow channel 2 (not shown in the figure).

Figure 1B:
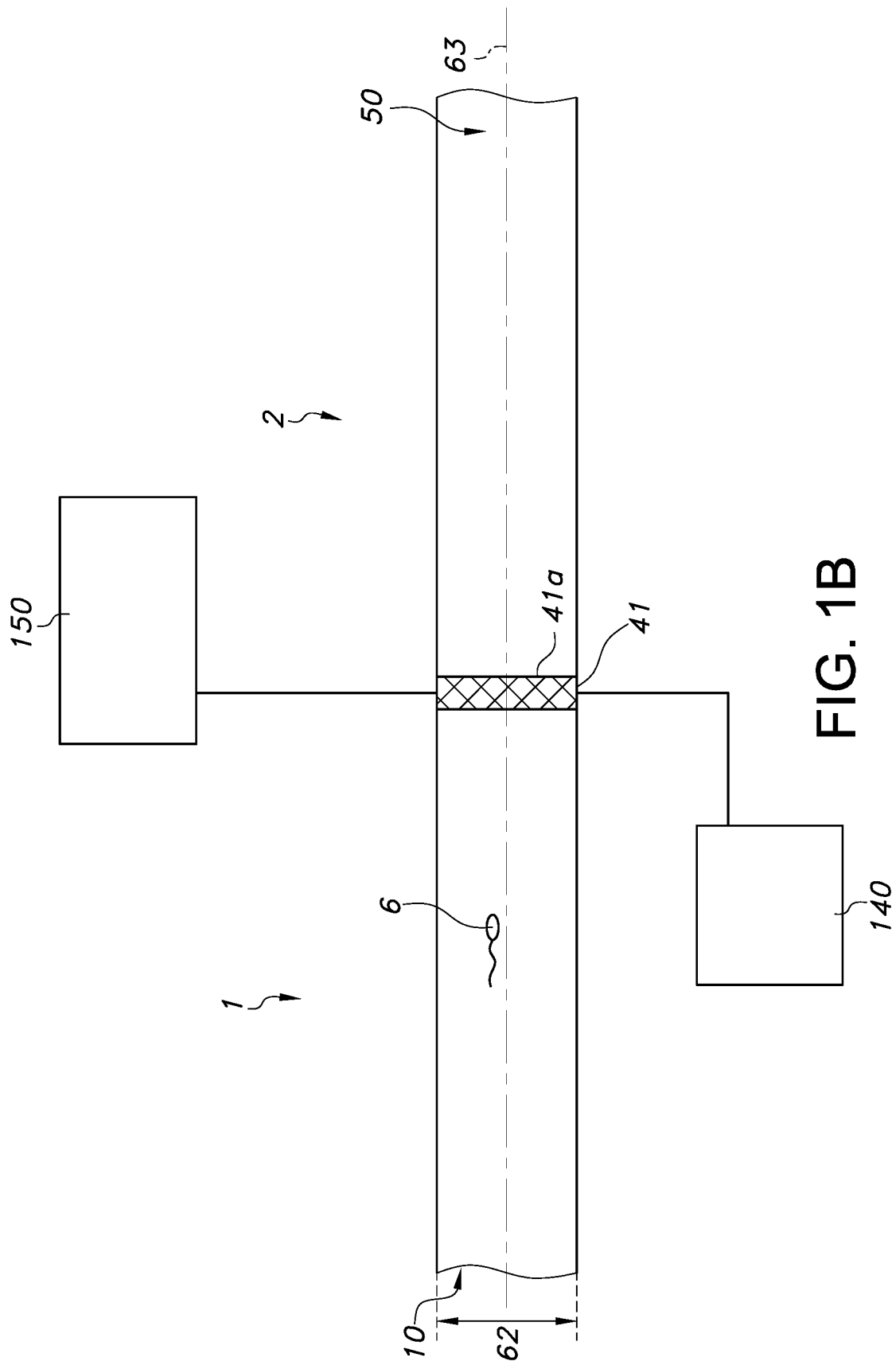

FIG. 1b depicts (a top-view of) of a part of an embodiment of the system 1, wherein the fluid flow channel 2 is rotated over 90° over the fluid flow channel axis 63 with respect to the system 1 depicted (at a side view) in FIG. 1a. This embodiment comprises only a first pair of electrodes 41, of which only one electrode 41a is visible, connected to an electronic device 140 and a measuring device 150 (for illustrative purposes the connection is pictured although the measuring device actually will be connected to the measuring electrode 41b that is not shown in this figure). The flow channel 2 further comprises an inlet 10, an analyzing zone 40 and a sorting zone 50. The outlets 80, 90 (and 100) are not shown in the figure. The second dimension of the flow channel perpendicular to the fluid flow channel axis and to the first dimension 61 (not visible) is schematically depicted by reference 62.

Figure 2:
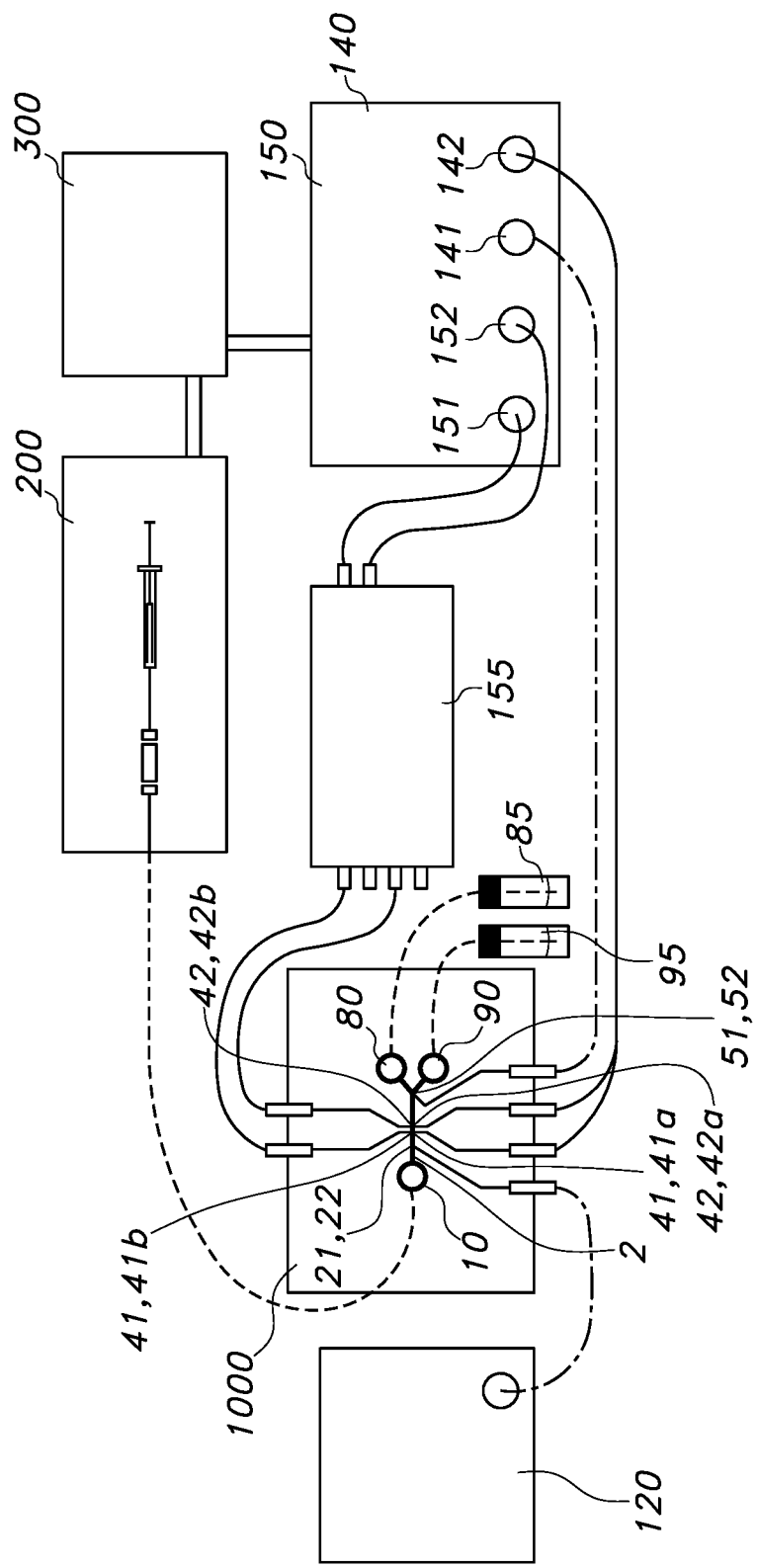
FIG. 2 schematically depicts other embodiments of the system.

FIG. 2 schematically depicts some further aspects of embodiments of the system 1 for sorting a sperm cell 6. In FIG. 2 an embodiment comprising a fluid flow channel 2 configured in (on) a chip 1000 is depicted. A flow of fluid comprising sperm cells 6 may be provided by a pumping device 200. The flow channel 2 comprises two pairs of electrodes 41, 42 for analyzing the sperm cell 6 and two electromagnetic devices 22, 52, also schematically depicted like electrodes although the electromagnetic devices 22, 52 may comprise more than one electrode, especially to provide an inhomogeneous electric field. In this embodiment, the electrical signal is provided to both of a primary electrode 41a, 42a of the pairs of electrodes 41, 42 by (an electric source 140) an impedance spectroscope 140, wherein a first output channel 142 is connected to the primary electrodes 41a and 42a. The impedance spectroscope 140 also functions as the measuring device 150, for which the measuring electrodes 41b, 42b, of the pairs of electrodes 41, 42 are connected to a first input channel 151 and a second input channel 152 of the measuring device 150. In this embodiment the same electrical signal is provided to primary electrodes 41a and 42a of the first pair of electrodes 41 and the second pair of electrodes 42. Other embodiments may comprise only one primary electrode 41a being comprised in both the first pair of electrodes 41 and the second pair of electrodes 42. Especially, the two measuring signals of the two electrodes 41b and 42b in this embodiment are both separately amplified with a pre-amplifier 155. For measurements in differential state, the absolute impedance data from the second pair of electrodes 42 is subtracted from the signal of the first pair of electrodes 41 before peak detection and storage. An optional control system 300 is also depicted, wherein the control system may control the pumping device 200 and if relevant the sorting device (via an electric source 140) and a focusing device 21 (not depicted). The control system 300 also may be applied for processing the measured signal and the control system 300 may also comprise options to graphically present the analysis. In the figure also embodiments of the focusing device 21 and the sorting device 51 are depicted. Especially the focusing device is configured as a second electromagnetic device 22, wherein a the focusing functionality on a sperm cell 6 (not shown) is provided by an electric field provided by the second electromagnetic device 22 that is connected to a wave form generator 120. The sorting device 51 is configured as a first electromagnetic device 52, wherein a sperm cell 6 may be directed to one of the outlets 80, 90 (into a first container 85 or into a second container 95) based on the identification in the analyzing zone an by means of an electric field provided by the first electromagnetic device 52 that is connected to a the second output channel 141 of the electronic source 140. Especially the sorting device may be arranged in the fluid flow channel 2, like depicted in FIG. 1a. In a specific embodiment, the sorting device, especially comprising the first electromagnetic device 52 is configured outside the fluid flow channel 2. Especially, also the focusing device 21 may be arranged in the fluid flow channel 2. In a specific embodiment, the focusing device 21, especially comprising the second electromagnetic device 22 is configured outside the fluid flow channel 2.

In FIG. 2 schematically a system using two pairs of electrodes 41, 42 is depicted and explained above for measuring in a differential state. The system 1, however, also may be used, applying only the first pair of electrodes 41 (and disconnecting the second pair of electrodes 42) (likewise an embodiment of system 1 comprising only the first set of electrodes 41 may be applied) and measuring in a non-differential state. Especially for that a 4-point measurement may be performed, wherein the first electrode 41a of the first pair of electrodes is connected to both the first output channel 142 and the second input channel 152, whereas the second electrode 41b of the first pair of electrodes is directly connected to the second input channel 142 and at the same time the second electrode 41b of the first pair of electrodes is connected via pre-amplifier 155 to the first input channel 151 of the measuring device 150. This setup allows to measure the voltage differentially at the second input channel 152 by connecting both the first and second electrode to the second input channel 152 and to measure the amplified current by connecting the first electrode 41a to the first output channel 142 and the second electrode 41b to the first input channel 151 (via the pre-amplifier 155). All other connections may be maintained as described above. Of course a non-differential measurement may also be performed by a 2-point measurement, wherein (only) the current between the electrodes 41a, 41b of a pair of electrodes 41 is measured and the voltage is set (by connecting the output channel 142 to primary electrode 41a, and the input channel 151 via the preamplifier 155 to the measuring electrode 41b).

Figure 3B:
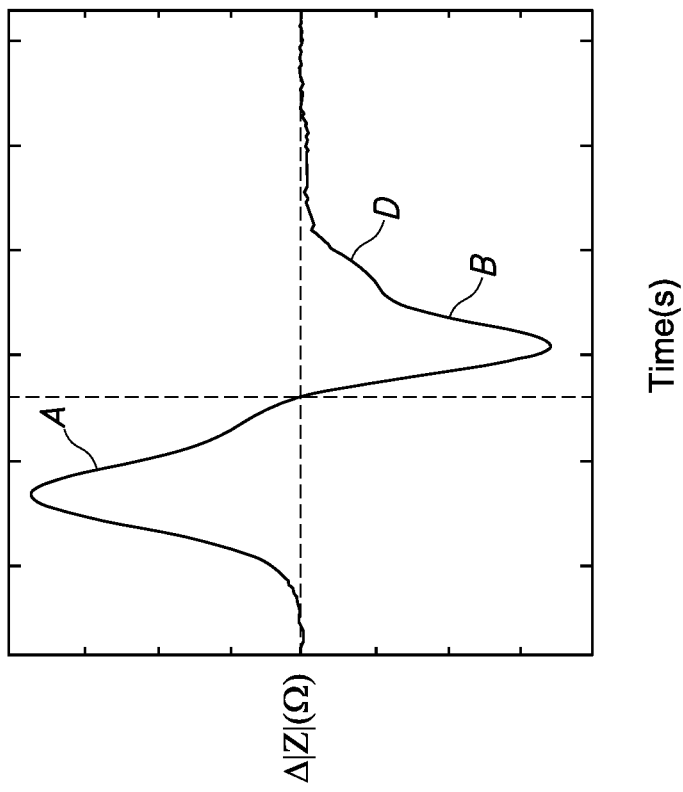
FIGS. 3a-b schematically depict some aspects of the method for sorting sperm cells.
Figure 3A:
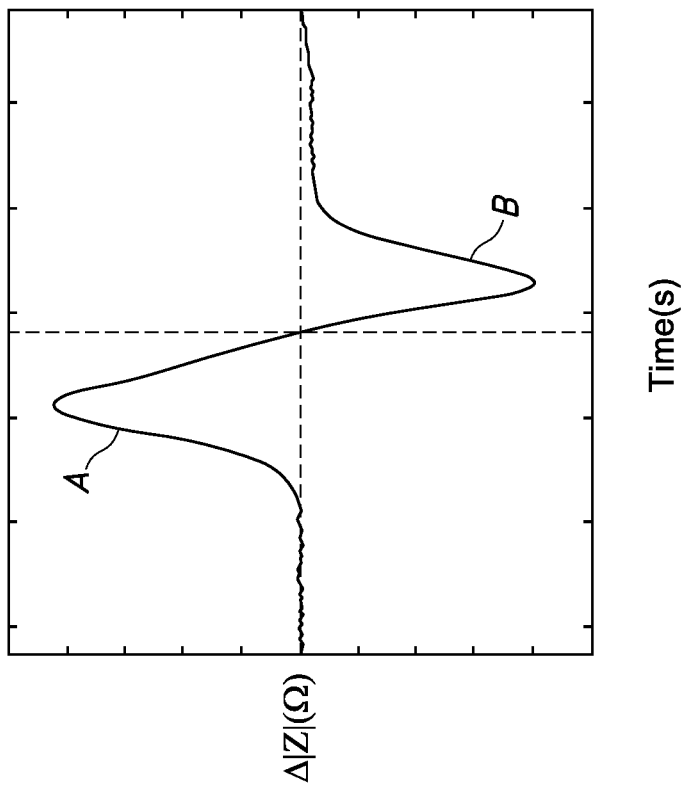

In FIGS. 3a and 3b some typical (graphically represented) examples are depicted for a measuring curve of a normal sperm cell (FIG. 3a) and a sperm cell comprising a cytoplasmic droplet (FIG. 3b). In the figures differential measuring data are graphically depicted, showing a positive first peak A and a negative second peak B. Especially, the droplet may be identified because it provides an extra shoulder D in the peaks, graphically most pronounced in the second (negative) peak B.

Figure 4:
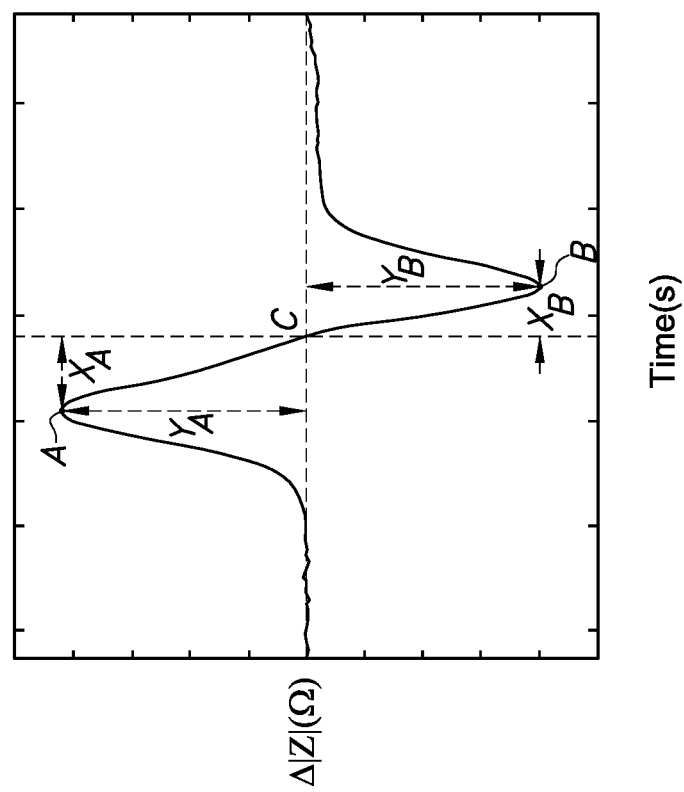
FIG. 4 schematically depicts a differential signal curve.

FIG. 4 shows an embodiment for analyzing the time-dependent impedance data, especially here also provided by a (graphical representation of) the differential signal curve data, showing a positive first peak A and a negative second peak B. Sorting of the sperm cells 6 may be based on the processed area under the measuring curve, especially under the negative peak B by comparing said area with reference data of the (processed) area under the curve for morphological normal sperm cells and morphological abnormal sperm cells. The processed area under the curve may be provided by first normalizing the measuring curve based on the peak height $Y_B$ and the peak width $X_B$. Especially after normalizing the curve a significant difference was found for an area under the processed measuring curve caused by an abnormal sperm cell 6 (comprising a cytoplasmic droplet) and an area under the processed measuring curve caused by a normal sperm cell 6.

Figure 5:
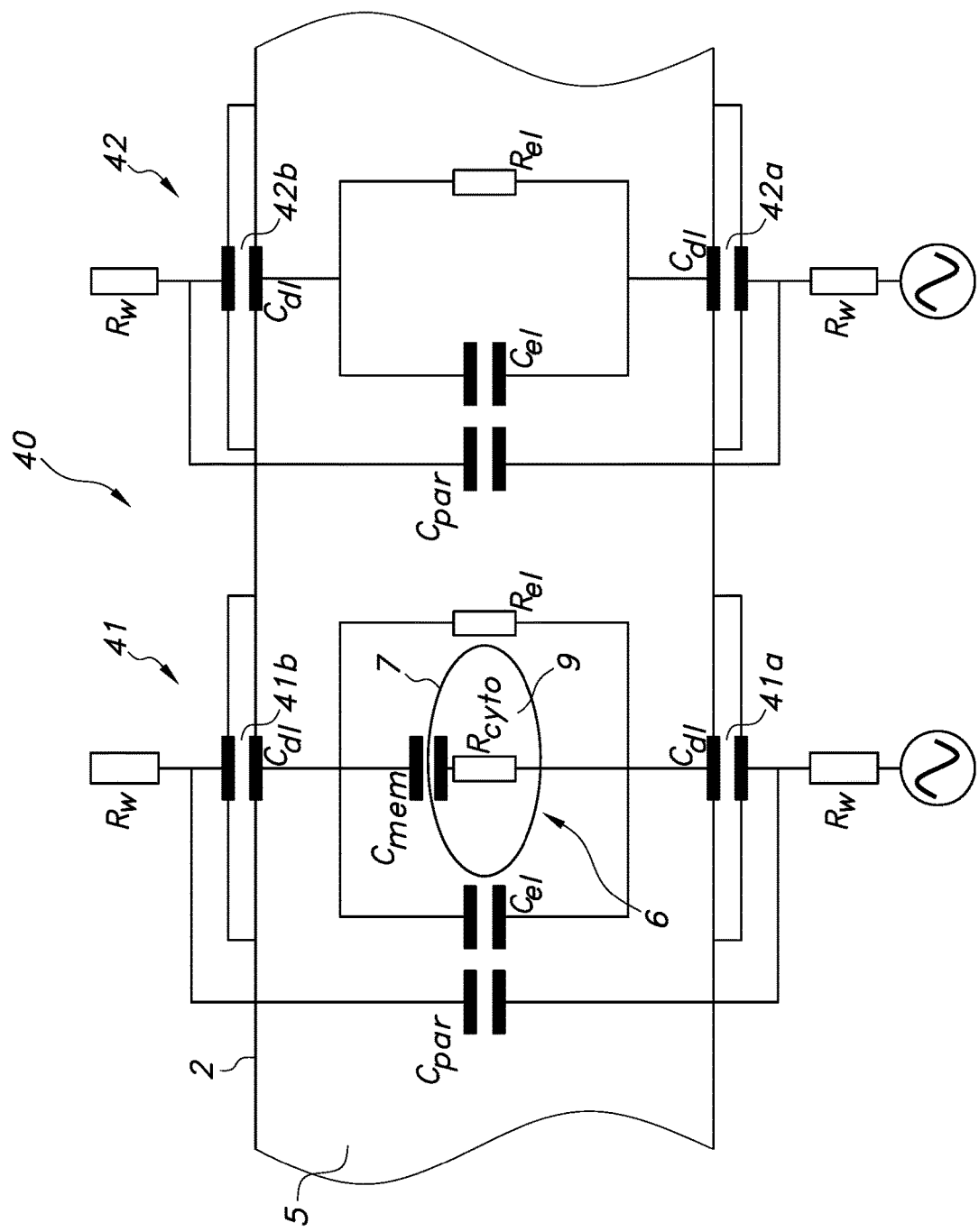
FIG. 5 schematically depicts an electrical circuit model of an embodiment of the analyzing zone system comprising two pairs of electrodes.

FIG. 5 schematically depicts an Electric circuit model (ECM) of an embodiment of the analyzing zone 40 comprising two electrode pairs for differential impedance analysis. Without a cell 6 in between the pair of electrodes 41, 42 (depicted in the second pair of electrodes 42), the system 1 is described by an electrode-electrolyte (double layer) interface ($C_{dl}$), electrolyte (comprising a resistance $R_{el}$ and a capacity $C_{el}$) of the fluid 5, the parasitic effects of the microelectrodes ($C_{par}$) and the wire resistance ($R_w$). A passing sperm cell 6 adds a cell membrane capacitance ($C_{mem}$) and cytoplasm resistance ($R_{cyto}$) to the ECM, considering Foster and Schwan's simplified ECM for a single-shelled spheroid in suspension (depicted in the first pair electrodes 41).

EXPERIMENTAL

Materials and Methods
Chip Fabrication

Microfluidic chips were fabricated using routine photolithography wet etch, sputter and bonding techniques. After cleaning two borofloat glass wafers (BF33, 100 mm diameter, 500 and 1100 µm thick), microelectrodes were fabricated after resist deposition, exposure and developing, BHF wet-etching, deposition of titanium/platinum layers (layer thickness 30 and 120 nm, respectively) and resist lift-off. Subsequently, inserts for fluidic and electric connections were powder blasted through both wafers (particle size 30 µm). After cleaning the wafers using ultrasound and $HNO_3$, a layer of foil (20 µm, PerMX3020, Dupont) was laminated on the 500 µm wafers at 80° C. After lamination, the wafers were pre-baked (5 min at 50° C., 5 min at 65° C. and 10 min at 85° C.) to improve adhesion of the foil to the glass. Exposure was performed using a 12 mW/cm$^2$ UV source. Subsequently, a post-exposure bake was performed (5 min at 50° C., 5 min at 65° C. and 10 min at 85° C.). The polymer layer was developed using a spin-coater. After aligning the 500 µm wafers with respect to the 1100 µm wafers using a bond chuck, they were bonded together using an anodic bonder. Subsequently, the wafer stack was hard-baked in a heated press. After dicing, the chips were ready to use. Two different chips designs were used in the described experiments. For the electrical analysis of the sperm morphology, differential impedance measurements were performed in a 20 µm high and 20 µm wide channel containing two electrode pairs with an electrode width of 10 µm and a separation of 20 or 40 µm. Impedance based cell sorting experiments were performed in a 20 µm high and 100 µm wide channel using a single electrode pair with a width of 20 or 50 µm.

Sample and Chip Preparation

Fresh boar semen was obtained from a local artificial insemination center at a concentration of 20×10$^6$ cells ml$^{-1}$. The samples were diluted with Beltsville Thawing Solution (BTS) to a concentration of 5×10$^6$ cells ml$^{-1}$. Before each experiment, the microfluidic channel was coated with poly (L-lysine)-grafted-poly(ethylene glycol) (PLL-g-PEG) to prevent cell adhesion. PLL-g-PEG was rinsed through the channel at a concentration of 100 µg ml$^{-1}$ in DI water for at least 15 min at a flow rate of 0.5-1 µl/min using a syringe pump. BTS solution was rinsed for at least 15 min at a flow rate of 0.5-1 µl/min to remove remaining coating solution. Subsequently sperm solution was flushed through the channel at a flow rate of 0.5-1 µl/min. Upon visualization in the microfluidic channel, the flow rate was changed to 0.013-0.75 µl/min before impedance acquisition.

Impedance Detection and Analysis

Impedance was recorded using a Zurich HF2IS impedance spectroscope equipped with a HF2TA preamplifier (also depicted in FIG. 2). Two different modes of operation were used in the experiments. In differential state, an AC signal with an amplitude of 0.5 V was generated on output 1 and applied to the differential electrode pair of the device under test (DUT). The two corresponding electrodes of the differential electrode pair were connected to input 1 and input 2 of the impedance spectroscope via two separate current amplifying channels of the HF2TA preamp. In non-differential state, a 4-point measurement was performed. The current was amplified using channel 1 of the HF2TA current amplifier connected to input 1 of the impedance spectroscope. The voltage was measured differentially at input 2. In both states, the impedance was recorded using a 1 MHz sinusoidal excitation with an amplitude of 0.5 V, a bandwidth of 200 Hz and a sample frequency of 3598 Hz unless mentioned otherwise. Recorded impedance data was imported and processed in Matlab (R2013a, MathWorks). For measurements in differential state, the absolute impedance data from input 2 was subtracted from signal 1 before peak detection and storage. In non-differential state, drift and offset were removed by using a moving average filter. Subsequently, peaks were detected and stored.

Cell Focusing and Sorting Using Dielectrophoresis

The sperm cell orientation and location within the micro channels was processed using dielectrophoresis (DEP). Cell focusing was performed by applying a 10 MHz, $6V_{pp}$ sinusoidal excitation on the focusing electrodes (Agilent X) unless mentioned otherwise. Similarly, cell sorting was performed by identical excitation using the Aux1 output of the impedance spectroscope.

Image Analysis

Sperm tracking was performed using the "motion-based multiple object tracking" function of the computer vision system toolbox in Matlab. This function processes every frame one by one and detects objects by comparison to a static background. These objects are tracked over time and assigned to object trajectories. This readily available function in Matlab was adapted to allow storage of objects' time data, location and size. To investigate the effect of the sperm location and size on the impedance, this data was matched to acquired impedance data.

Integrated Data Acquisition and DEP Sorting Using LabVIEW

Sorting sperm cells using DEP based on impedance data requires a control system which combines both techniques. Furthermore, this system must allow control over the syringe pump and acquisition of optical data for verification purposes. Fortunately, virtual instrument (VI) drivers are available for all involved equipment. These drivers take care of low-level communication between the computer (LabVIEW) and the instruments, and contain high-level functions to control them. At start up of the LabVIEW control program, the impedance spectroscope, pump and camera are initialized when selected in the user interface. After configuration of the instruments and initiation of the experiment, the experimental data (video and impedance) and instrument reports are saved automatically. Since the video and impedance measurements are time-stamped within the program, corresponding data files are synchronized. In sorting mode, the control program monitors the impedance over time. Upon particle or cell passing, there is a change in impedance.

Simulation

The electrical response of the microfluidic setup was investigated by constructing a numerical model of the circuit in Matlab. This model is well described in literature and is based on Foster and Schwan's simplified electrical circuit model (ECM) for a single-shelled spheroid in suspension. In simulations, a parallel electrode configuration was modelled without field fringing at the electrode edges. Furthermore, sperm cells were modelled as spheroids with equal cell volume ($1.21 \times 10^{-15}$ m$^3$).

Results

Electrical Circuit Model

Impedance spectroscopy is a commonly used tool for label-free analysis of adherent cells or cells in suspension. This technique has been used extensively to investigate the dielectric properties of cells in microfluidic systems. Constructing an electrical circuit model (ECM) is a simple way to gain insight into the electrical response of the microfluidic setup (FIG. 5). The capacitive properties of the microelectrode setup are predominantly determined by the electrode/electrolyte interface ($C_{dl}$), the electrolyte ($C_{el}$) and the parasitic effects of the microelectrodes ($C_{par}$). The resistive response is influenced by the lead wires ($R_w$) and the conductivity of the electrolyte ($R_{el}$). When a sperm cell is introduced between the microelectrodes, the capacitive and resistive properties will be altered by the cell membrane ($C_{mem}$) and the cell's cytoplasm ($R_{cyt}$), respectively. The simulation showed a big effect of the double layer on the absolute impedance. Due to a small electrode surface area and a small $C_{dl}$ correspondingly, the impedance continuously decreased over a broad frequency range. At a frequency of approximately 1.3 MHz a resistive plateau was formed. A frequency sweep of the electrode setup showed similar behavior compared to the simulation, indicating that a measurement frequency of 1.3 MHz is an appropriate choice for sperm impedance analysis in this setup. At this frequency, simulation showed an impedance increase of approximately 800Ω when introducing a sperm cell in between the electrodes.

Impedance Analysis of Cell Orientation and Morphology

Impedance analysis was performed by flowing sperm cells through a 20 µm high, 100 µm wide microfluidic channel with a 20 µm wide channel restriction at a flow rate between 0.013 and 0.02 µl min$^{-1}$. The impedance was recorded differentially with two electrode pairs with an electrode width of 10 µm and an electrode separation of 20. After calculating the difference between the electrical responses of both electrode pairs, baseline correction and peak detection were performed. The resulting peak height distribution showed good agreement with the simulated change of impedance in case of a single sperm passing the electrodes. However, this distribution showed a big spread in data, ranging from values between 200 and 2500Ω. Factors which influence the width of this distribution are e.g. the cell orientation, location and cellular properties. Due to these factors, the absolute impedance change is not a suitable parameter to characterize morphological differences. A different approach is the analysis of the peak shape over time. A sperm cell has a very distinct shape and its typical length is larger compared to the microchannel geometries (width and length) and the width of the microelectrodes. When a sperm cell is flown through this microchannel, the cell will align itself over its longitudinal axis with respect to the channel wall. Consequently, the distinct parts of the sperm cell (head, midpiece and flagellum) will pass the electrical field between the microelectrodes at different points in time and will affect the recorded impedance, accordingly. As a result, the peak shape may contain information about the cell orientation and its morphology.

To test this hypothesis, the impedance peak shape of passing sperm cells was investigated (using an electrode separation of 20 µm). The spectra showed a positive and negative peak (FIG. 3), corresponding to sperm passing through the first and second electrode pair, respectively. At zero-crossing, the recorded impedance at input 1 and 2 is equal, at which point the sperm head is positioned in between the two electrode pairs, approximately. The spectra showed a clear effect of the cell orientation on the peak shape. When a sperm passed the electrodes head-first, the recorded impedance over time showed a positive peak, negative peak and a slight impedance difference before returning to zero the latter corresponding to the presence of the sperm flagellum in between the electrodes. In tail-first orientation, this small impedance difference was observed before the sperm head arrived at the first electrode pair. Furthermore, information about cell morphology could be extracted from the data. Cytoplasmic droplet content on the flagellum resulted in broadening of the measured peaks. A clear example is illustrated in FIG. 3b, in which a clear bump in the signal is observed in between the peak minimum and the small impedance change corresponding to the sperm flagellum.

One way to extract information regarding cytoplasmic droplet content from the impedance data is to analyze the area under the curve (AUC). In total, 18 morphologically normal and 18 droplet-containing sperm cells were selected for analysis. Using Matlab, the maximum (FIG. 4, A), minimum (B) and zero crossing point (C) were determined. Subsequently, the AUC of the positive and negative peak were calculated. When comparing the AUC means of the negative peaks of the two populations using a (paired sample) t-test, no statistical difference was found (p=0.52). A plausible explanation is the effect of the cell orientation, location and velocity on the AUC. The orientation (cell tilting) and location influence the peak height and the cell velocity has an effect on the peak width. After correction for the peak height ($Y_B$) and peak width ($X_B$), a significant difference is found between the AUC's of both populations (p=0.003), see next table:

|  | AUC | Std | $AUC_{norm}$ | $Std_{norm}$ |
|---|---|---|---|---|
| Control | 2.96e4 | 1.50e4 | 5.05e3 | 7.25e2 |
| Droplet | 2.6e4 | 1.58e4 | 6.98e4 | 2.36e3 |
|  |  | p = 0.52 |  | p = 0.003* |

*α = 0.01

Effect of Dielectrophoretic Focusing on Cell Location and Velocity

Cell location and velocity are important parameters to control in the design of a cell sorting system. Defined cell location and velocity are necessary to perform accurate measurements of the sperm morphology and to control cell sorting after analysis. Dielectrophoretic focusing is used to control these parameters. To show the effect of DEP focusing on the cell location, sperm cells were flown through the microfluidic channel with and without DEP excitation. Without DEP excitation, the distribution of sperm cells within the channel is random. With DEP excitation, the sperm cells were clearly deflected to the middle of the channel, which is confirmed by a small distribution of Y-location. The velocity of the sperm cells was investigated near the impedance electrodes. The cell location and velocity were determined right after passing the 20 µm electrode pair. Impedance data was matched to the video data to investigate the effect of the velocity, orientation and location. First of all, the cell velocity and location were investigated with and without DEP focusing. Without focusing, image analysis showed broad distributions in cell location and velocity (the middle of the channel was positioned at approximately 64 µm; the channel borders are positioned at approximately 12 and 116 µm). With focusing, the width of these distributions was reduced extensively as can be observed especially from smaller differences between the median value and the first and third quartile values (i.e. interquartile distance) found after focusing compared to the difference observed without focusing see table below: It is noted that no significant effects of the mean cell velocity and location were observed on the recorded impedance.

|  |  | Median | First quartile | Third quartile | Min | Max |
|---|---|---|---|---|---|---|
| Focused (n = 456) | Location (µm) | 61.3 | 59.1 | 63.1 | 18.4 | 101.7 |
|  | Velocity (µm/s) | 322.4 | 299.7 | 338.1 | 0.7 | 393.5 |
| Non-focused (n = 392) | Location (µm) | 51.3 | 37.7 | 66.0 | 15.0 | 101.7 |
|  | Velocity (µm/s) | 286.4 | 232.1 | 329.0 | 0.3 | 397.6 |

Impedance-Controlled Sorting of Sperm Cells

The next step in the development of a label-free cell sorting system is the design of an algorithm which is able to actively sort sperm cells based on impedance detection. As a proof-of-concept experiment, the beads and sperm cells have been sorted based on impedance. LabVIEW was chosen as development platform. After focusing and detection, the beads and sperm cells must be actively sorted. The LabVIEW program monitors the impedance continuously. Whenever a change in impedance is recorded, from which the peak shape matches the peak template, the width and the height of the peak are determined. The peak width is used to calculate the particle's velocity in order to predict the estimated time of arrival (ETA) at the sorting electrodes. The total peak height determines whether a particle is sorted or not. This selection is based on the impedance window of interest (WOI). In this example, 3 µm polystyrene beads will be sorted from sperm cells. A mixture of sperm cells and beads was flown through the microfluidic channel at a flow rate of approximately 0.025 µL $min^{-1}$. The impedance WOI was set to 4-8 Ohm, which matches the impedance change when a bead passes the electrodes. The average impedance change of sperm cells is approximately 17 Ohms, which is above the WOI. Whenever an impedance change of a particle is detected, which fits within the WOI, the DEP electrodes are activated to sort the particle in the top channel. When beads pass the electrodes, impedance peaks were recorded within the WOI, consequently sorting the beads actively in the top channel at the channel split. Whenever sperm cells or debris passed the detection electrodes, the recorded impedance was above or below the WOI. As a result, sperm cells and debris were drawn in the bottom channel without being deflected by the sorting electrodes. The sorting speed in the described experiment was low (<1 sperm cell $s^{-1}$) due to low bead and sperm concentrations and small flow rates. Furthermore, the sorting speed of this system is limited to approximately 5 cells $s^{-1}$ due to limitations in the computational speed of the LabVIEW software. However sorting was about 100% effective.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim.

Use of the verb "to comprise" and its conjugations does not exclude the presence of elements or steps other than those stated in a claim. The article "a" or "an" preceding an element does not exclude the presence of a plurality of such elements.

The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings.

The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A system for performing sperm analysis and selection based on sperm cell morphology of sperm cells in a fluid, the system comprising:
   (i) a fluid flow channel for transport of said fluid, the fluid flow channel comprising an inlet, an analyzing zone configured downstream from said inlet and comprising a first pair of electrodes comprising a first intra-electrode distance, and a second pair of electrodes comprising a second intra-electrode distance and configured at an inter-electrodes distance from the first pair of electrodes, a sorting zone configured downstream from said analyzing zone, and outlets configured downstream from said sorting zone;
   (ii) an electric source configured to provide a first electric signal to the first pair of electrodes and a second electric signal to the second pair of electrodes;
   (iii) a measuring device functionally coupled to the first pair of electrodes and functionally coupled to the second pair of electrodes, and configured to measure a first impedance as a function of time of the fluid between the first pair of electrodes, and to measure a second impedance as a function of time of the fluid between the second pair of electrodes, and to provide time-dependent impedance data based on the first impedance and the second impedance, wherein the time-dependent impedance data comprise differential signal curve data, wherein the differential signal curve data are provided by subtracting the second impedance as a function of time from the first impedance as a function of the time;
   (iv) a sorting device configured to sort sperm cells between morphological normal sperm cells and morphological abnormal sperm cells by directing the sperm cell in the sorting zone to one of the outlets based on a comparison in a comparison stage of the time dependent impedance data with predefined reference data, wherein in the comparison stage a differential signal curve of the differential signal curve data is compared with a differential signal curve of differential signal curve data of normal sperm cells and a differential signal curve of differential signal curve data of abnormal sperm cells.

2. The system according to claim 1, wherein the fluid further comprises a further particulate material, wherein the system comprises a further outlet, and wherein the sorting device is further configured to sort the further particulate material by directing the further particulate material in the sorting zone to one of the outlets based on a comparison in the comparison stage of the time dependent impedance data with predefined reference data.

3. The system according to claim 1, further comprising a focusing zone configured upstream from said analyzing zone and downstream from said inlet, and a second electromagnetic device to provide an electric field to the focusing zone, wherein the sorting device comprises a first electromagnetic device to provide an electric field to the sorting zone, and the first electromagnetic device is configured to direct the sperm cell by dielectrophoretic force to one of the outlets, and the second electromagnetic device is configured to direct the sperm cell in the focusing zone by dielectrophoretic force.

4. The system according to claim 1, wherein a first dimension selected from height and width of the fluid flow channel is selected from the range of 5-400 µm and a second dimension selected from width and height of the fluid flow channel is selected in the range 5-400 µm, and wherein a cross-sectional area is selected from the range of 100-10,000 µm$^2$.

5. The system according to claim 1, wherein the reference data contain information on the presence or absence of a cytoplasmic droplet.

6. The system according to claim 1, wherein the inter-electrodes distance is selected from the range of 10-100 µm and the time-dependent impedance data are based on a difference between an absolute value of the first impedance at a time and an absolute value of the second impedance at said time.

7. The system according to claim 1, wherein (i) the first pair of electrodes are configured at two opposite sides of the flow channel, with the flow channel in between, and the second pair of electrodes are configured at two opposite sides of the flow channel, with the flow channel in between.

8. The system according to claim 1, wherein the first intra-electrode distance and the second intra-electrode distance are substantially the same.

9. The system according to claim 1, wherein in the comparison stage a shape of the differential signal curve of differential signal curve data is compared with a shape of the differential signal curve of differential signal curve data of normal sperm cells and a shape of the differential signal curve of differential signal curve data of abnormal sperm cells, wherein the differential signal curve of differential signal curve data of normal sperm cells shows a positive and a negative peak, and wherein the differential signal curve of differential signal curve data of abnormal sperm cells shows an additional peak between the negative peak and tailing of the negative peak.

10. The system according to claim 1, wherein in the comparison stage an area under the differential signal curve is compared with an area under the differential signal curve of normal sperm cells and an area under the differential signal curve of abnormal sperm cells.

11. The system according to claim 1, wherein the sorting device directs an abnormal sperm cell to one of the outlets and a normal sperm cell to another outlet.

12. A method for sorting sperm cells in a fluid between morphological normal sperm cells and morphological abnormal sperm cells, the method comprising:
   (i) providing a fluid flow comprising the sperm cells into a fluid flow channel, wherein the fluid flow channel comprises a first pair of electrodes and a second pair of electrodes comprising a second intra-electrode distance and configured at an inter-electrodes distance from the first pair of electrodes;
   (ii) providing a first electric signal to the first pair of electrodes and providing a second electric signal to the second pair of electrodes;
   (iii) measuring a first impedance as a function of time of the fluid between the first pair of electrodes, and measuring a second impedance as a function of time of the fluid between the second pair of electrodes, and providing time-dependent impedance data based on the first impedance and the second impedance, wherein the time-dependent impedance data comprise differential signal curve data, wherein the differential signal curve data are provided by subtracting the second impedance as a function of time from the first impedance as a function of the time;
   (iv) sorting the sperm cells between morphological normal sperm cells and morphological abnormal sperm cells based on comparing the time-dependent impedance data with predefined reference data in a comparison stage, wherein in the comparison stage a differential signal curve of the differential signal curve data is compared with a differential signal curve of differential signal curve data of normal sperm cells and a differential signal curve of differential signal curve data of abnormal sperm cells.

13. The method according to claim 12, further comprising focusing the sperm cell in the fluid flow channel at a location upstream of the first pair of electrodes and wherein focusing the sperm cell comprises either (i) providing a further fluid flow of a support material into the fluid flow channel to envelop the sperm cell with the further fluid flow or (ii) providing a non-uniform electric field to the sperm cell to direct the sperm cell in the fluid flow.

14. The method according to claim 12, wherein measuring the impedance comprises measuring the impedance at a frequency selected from the range of 10 kHz-100 MHz.

15. The method according to claim 12, wherein sorting sperm cells based on comparing the time-dependent impedance data with predefined reference data comprises comparing the time-dependent impedance data with a symmetric curve.

16. The method according to claim 12, wherein the fluid comprises sperm cells in a concentration of $2 \cdot 10^3$-$2 \cdot 10^8$ cells/ml and wherein the sperm cells are selected from the group of cattle sperm cells consisting of boar sperm cells and bull sperm cells.

17. The method according to claim 12, wherein comparing in the comparison stage comprises comparing a processed area under the differential signal curve with reference data of a processed area under the differential signal curve for morphological normal sperm cells and for morphological abnormal sperm cells, wherein the processed areas under the curves are provided by normalizing the respective differential signal curve based on a peak height (YB) and a peak width (XB), wherein the peak height (YB) is a minimal impedance signal value of a negative peak of the respective curve and the peak width (XB) is the corresponding measuring time at the peak height (YB) minus the measuring time corresponding to a start of the negative peak.

18. The method according to claim 12, wherein in the comparison stage a shape of the differential signal curve of differential signal curve data is compared with a shape of the differential signal curve of differential signal curve data of normal sperm cells and a shape of the differential signal curve of differential signal curve data of abnormal sperm cells, wherein the differential signal curve of differential signal curve data of normal sperm cells shows a positive and a negative peak, and wherein the differential signal curve of differential signal curve data of abnormal sperm cells shows an additional peak between the negative peak and tailing of the negative peak.

19. The method according to claim 12, wherein in the comparison stage an area under the differential signal curve is compared with an area under the differential signal curve of normal sperm cells and an area under the differential signal curve of abnormal sperm cells.

20. The method according to claim 12, wherein during the sorting an abnormal sperm cell is directed to one of the outlets and a normal sperm cell is directed to another outlet.

* * * * *